United States Patent [19]
Ferris et al.

[11] Patent Number: 5,631,972
[45] Date of Patent: May 20, 1997

[54] HYPERLADDER FINGERPRINT MATCHER

[76] Inventors: Stephen Ferris, 80 Campbell Ave., Troy, N.Y. 12180; Robert L. Powers, 37 Mansion Dr., Topsfield, Mass. 01983; Terry Lindh, 428 E. Shore Rd., DeLanson, N.Y. 12053

[21] Appl. No.: 434,997

[22] Filed: May 4, 1995

[51] Int. Cl.⁶ .................................................. G06K 9/00
[52] U.S. Cl. ........................... 382/125; 382/124; 283/68; 283/69
[58] Field of Search .................................. 382/124, 125; 283/68, 69

[56] References Cited

U.S. PATENT DOCUMENTS

| | | | |
|---|---|---|---|
| 3,893,080 | 7/1975 | Ho et al. | 382/125 |
| 4,135,147 | 1/1979 | Riganati et al. | 340/146.3 E |
| 4,185,270 | 1/1980 | Fischer, II et al. | 382/125 |
| 4,525,859 | 7/1985 | Bowles et al. | 382/125 |
| 4,646,352 | 2/1987 | Asai et al. | 382/5 |
| 4,747,147 | 5/1988 | Sparrow | 382/4 |
| 4,752,966 | 6/1988 | Schiller | 382/5 |
| 4,790,564 | 12/1988 | Larcher et al. | 283/69 |
| 4,817,183 | 3/1989 | Sparrow | 382/4 |
| 4,896,363 | 1/1990 | Taylor et al. | 382/5 |
| 4,944,021 | 7/1990 | Hoshino et al. | 382/5 |
| 5,105,467 | 4/1992 | Kim et al. | 382/4 |
| 5,109,428 | 4/1992 | Igaki et al. | 382/5 |
| 5,177,792 | 1/1993 | Morita | 382/4 |
| 5,187,747 | 2/1993 | Capello et al. | 382/124 |
| 5,239,590 | 8/1993 | Yamamoto | 382/4 |
| 5,267,324 | 11/1993 | Kumagai | 382/4 |
| 5,321,765 | 6/1994 | Costello | 382/4 |
| 5,351,304 | 9/1994 | Yamamoto | 382/5 |
| 5,420,937 | 5/1995 | Davis | 382/124 |

OTHER PUBLICATIONS

Sparrow, Malcolm K. and Sparrow, Penelope J., "A Topological Approach to the Matching of Single Fingerprints: Development of Algorithms for Use on Latent Fingermarks," National Bureau of Standards Special Publication 500–126, Oct. 1985.

Wegstein, J.H., "The M40 Fingerprint Matcher," National Bureau of Standards Technical Note 878, Jul. 1975.

*Primary Examiner*—Jose L. Couso
*Assistant Examiner*—Anh Hong Do
*Attorney, Agent, or Firm*—Schmeiser, Olsen & Watts

[57] ABSTRACT

A fingerprint matcher links together minutiae from a search print and minutiae from a file print in a chain to determine if the two prints match. Minutiae are extracted from the images of the search and file prints. Geometric and other relationships between close minutiae in each print are calculated. A table of candidate "steps" is formed. Each step consists of four minutiae, two close search minutiae and two close file minutiae. Each "rung" of the step is a search-file pair, the candidate mating of presumed identical minutiae in the two images. Each "riser" of the step is formed by two close minutiae, search minutiae on the one side and file minutiae on the other. A candidate step is entered into the table if and only if the relationships between search minutiae are similar to those between file minutiae. The number of candidate steps is reduced by requiring that each step adhere to various rules regarding the presence of other steps in the table and the identity of minutiae therein. Maximally long chains of steps are formed which are called "hyperladders", each of which links together surviving steps. The hyperladders are said to be "hyper" because at each search-file pair rung a multiplicity of "riser" pairs may emerge, each to another and different search-file pair "rung". Within the largest hyperladder formed from a given search-file pair of prints the number of links is a measure of the likelihood that the search and file fingerprints are the same, and an indication of a match is returned if the number of links exceeds a predetermined threshold value.

31 Claims, 22 Drawing Sheets

Table of candidate
mated pairs
(from FIG. 4)
28

→ If too few file pairs, then exit

30

First Restriction Operation

For every search minutia S0
    For all four quadrants q
        Consider Table entry < S1, { < F0, F1>, ....} > $_{S0, q}$.
        For every first file minutia F0 in the file pairs
            Consider the other quadrants q' of S0.
            Look for F0 as a first file minutia in such a Table entry
            < S2, { < F0, F2>, ....} > $_{S0, q'}$.
            If not found
                Eliminate file pair < F0, F1> from the original Table entry.

→ If too few file pairs, then exit

Table of candidate
mated pairs
(continuing)
28

FIG. 5

Table of candidate
mated pairs
(from FIG. 5) ─────╮
                     28

┌─ 32
Second Restriction Operation

For every search minutia S0
  For all four quadrants q
    Consider Table entry < S1, { < F0, F1>, ....} > $_{S0, q}$.
    For every second file minutia F1 in the file pairs
      Consider the Table entries for S1.
      If a file pair < F1, F2> appears in such a Table
        entry <S2, { < F1, F2>, ....} > $_{S1,q'}$
          Mark file pair < F0, F1 > in the original Table entry.
          Mark file pair < F1, F2> in the second Table entry.
          To be marked means "Do not eliminate".
For every file pair in the entire Table
  If the file pair remains unmarked
    Eliminate the file pair.

→ If too few file pairs, then exit
─ 34
Form the List of steps

For every file pair < F0. F1> in some Table of candidate mated
  pairs entry < S1, { < F0, F1>, .... } > $_{S0,q}$
    Add List entry < S0, S1, F0, F1>

─ 36
List of steps
< S0, S1, F0, F1>

FIG. 6

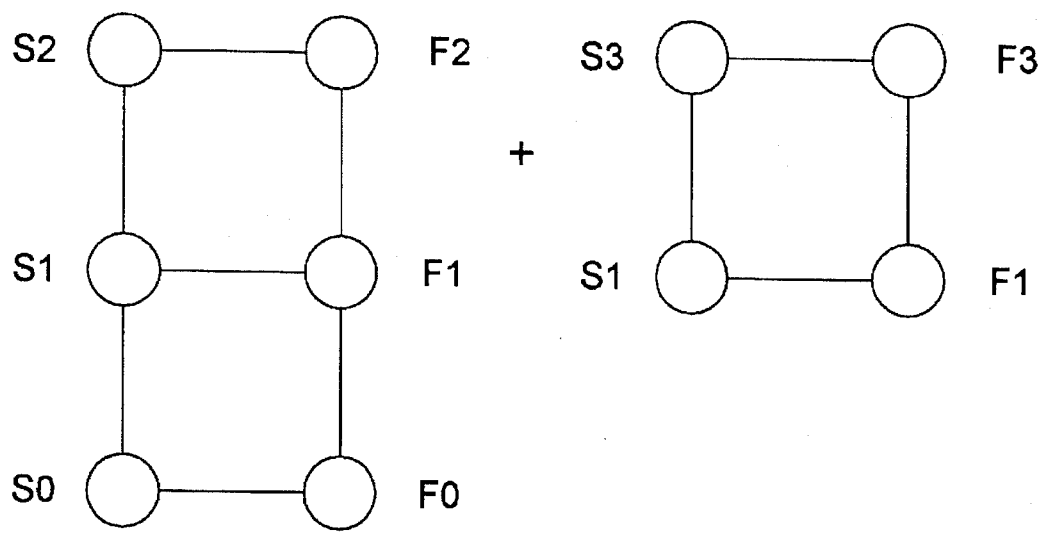
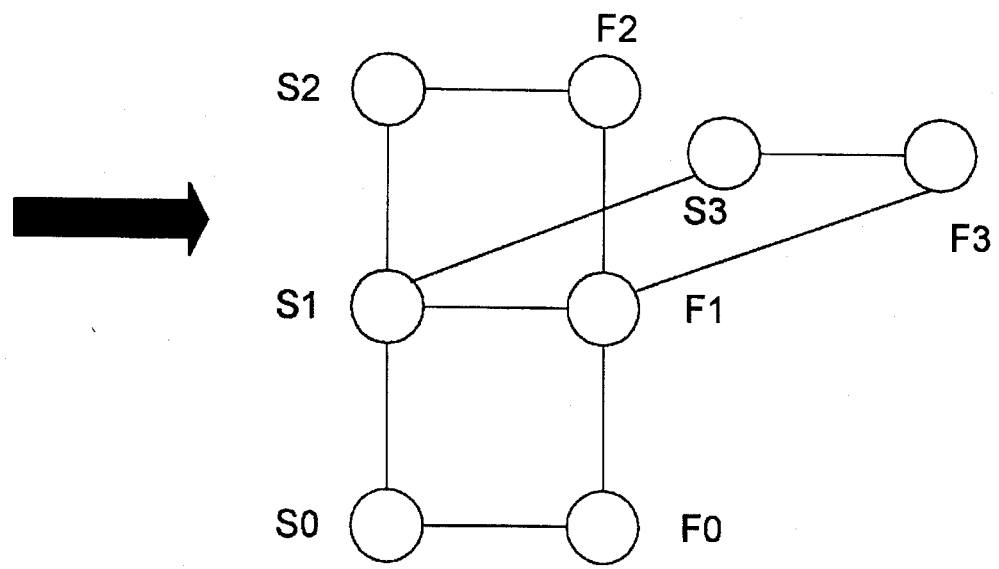
FIG. 12

List of steps
(from FIG. 6)

Build the Table of hyperladders

For 1000 every step from the List of steps 36
    All hyperladders (HLs) in the Table of HLs are "original".
    For 1100 every original HL in the Table of HLs
        Call the hyperladder "HLi".
        If 1200 both step rungs are in the HL
            Connect 1300 the new link within the HL.
        Else if 1400 one of the step rungs is in the HL
        {
        Call the rung "bound".
        Call the other rung "free".
        SEE FIG. 15.
        The Table of HLs may have been declared 1410 "full".
        }
        Else neither of the step rungs is in the hyperladder
            Do nothing
    If 1500 we never connected the step to any original HL
        Add 1600 the step to the Table as a new HL
    Sort 1700 the HLs in the Table according to the number of links.
    Eliminate 1800 HLs from the Table which are subsets of the others.
    If 1900 the top HL has at least 100 links
        Terminate 1910 the loop 1000 over steps
    If 1920 the Table of HLs has been declared 1410 "full"
        Terminate 1930 the loop 1000 over steps

Table of hyperladders

FIG. 14

(Within FIG. 14)

{
We have a step.
The bound rung is in hyperladder HLi.
The free rung is not.
Make 2000 a copy of HLi, called "HLi'".
If 2100 the free rung conflicts with another in HLi'
    One or both of these must obtain:
    If 2200 the rung search minutia has another mate in HLi'
        Remove 2210 all references in HLi' to the search minutia.
    If 2300 the rung file minutia has another mate in HLi'
        Remove 2310 all references in HLi' to the file minutia.
Connect 2400 the step to HLi' at the bound rung.
Enforce 2500 connectivity in HLi' to the new step.
Add 2600 HLi' to the Table of HLs.
If 2610 there are at least 100 HLs in the Table
    Declare 2620 that the Table is "full".
    Go back 2630 to declaration 1410 of FIG. 14.
For 2700 every original HL in the Table after HLi
    Call the hyperladder "HLj" (i<j).
    If 2800 the free rung is in HLj
        {
        SEE FIG. 18
        }
    Else the free rung is not in HLj.
        Do nothing.
}

FIG. 15

(Within FIG. 15)

{
We have a step.
We have hyperladders HLi and HLj.
Look 3000 for incompatible rungs between HLi and HLj.
Form 3100 a list of search minutiae in such rungs.
Call this the "List of conflicting search minutiae".
Form 3200 a list of file minutiae in such rungs.
Call this the "List of conflicting file minutiae".
Make 3300 a copy of HLi, called "HLbound".
Make 3400 a copy of HLj, called "HLfree".
Call minutiae in the bound rung "Sbound" and "Fbound".
Call minutiae in the free rung "Sfree" and "Ffree".
If 3500 Sbound is among the conflicting search minutiae
    Remove 3510 all references in HLfree to Sbound
    Enforce 3520 connectivity in HL free to Sfree.
If 3600 Fbound is among the conflicting file minutiae
    Remove 3610 all references in HLfree to Fbound.
    Enforce 3620 connectivity in HLfree to Sfree.
If 3700 Sfree is among the conflicting search minutiae
    Remove 3710 all references in HLbound to Sfree.
    Enforce 3720 connectivity in HLbound to Sbound.
If 3800 Ffree is among the conflicting file minutiae
    Remove 3810 all references in HLbound to Ffree
    Enforce 3820 connectivity in HLbound to Sbound.
If 3900 both HLbound and HLfree still exist
    {
    SEE FIG. 20.
    }
}

FIG. 18

(Within FIG. 18)

{
We have a step.
We have hyperladders HLbound and HLfree.
Reformulate 4000 the List of conflicting search minutiae.
Reformulate 4010 the List of conflicting file minutiae.
Establish 4100 a bit field for the conflicting search minutiae.
Establish 4110 a bit field for the conflicting file minutiae.
For 4200 each different combination of the bit field for search
    For 4300 each different combination of the bit field for file
        For 4400 each conflicting file minutia S
            If 4410 the corresponding bit is zero
                Remove 4420 all references in HLbound to S.
                Enforce 4430 connectivity in HLbound to Sbound.
            Else 4440 the corresponding bit is one.
                Remove 4450 all references in HLfree to S.
                Enforce 4460 connectivity in HLfree to Sfree.
        If 4500 either of HLbound or HLfree no longer exist
            Loop 4510 to next bit field combination for file.
        For 4600 each conflicting file minutia F
            If 4610 the corresponding bit is zero
                Remove 4620 all references in HLbound to F.
                Enforce 4630 connectivity in HLbound to Fbound.
            Else 4640 the corresponding bit is one.
                Remove 4650 all references in HLfree to F.
                Enforce 4660 connectivity in HLfree to Ffree.
        If 4700 both HLbound and HLfree still exist
            Merge 4710 HLbound and HLfree into a new HL.
            Connect 4720 the step to the new HL.
            Add 4730 the new HL to the Tabel of HLs.
        If 4730 there are at least 100 HLs in the Table
            Declare 4734 that the Table is "full".
            Go back 4736 to declaration 1410 of FIG. 14.
}

FIG. 20

HYPERLADDER FINGERPRINT MATCHER

BACKGROUND OF THE INVENTION

1. Field of the Invention

This invention generally relates to methods and apparatus for matching fingerprints with images of fingerprints stored electronically in a database, and more specifically relates to a fingerprint matcher that uses a ladder chaining method for matching fingerprints.

2. Description of the Related Art

In many contexts, especially in criminal situations, latent fingerprints of unknown origin are often encountered. Since any one person's fingerprints are unique to that person, the identity of a person who leaves a fingerprint may be ascertained if this print of unknown origin can be matched with a fingerprint of known origin. Two instances of the fingerprint (or "print") are used to make an identification. The print of unknown origin is commonly referred to as the "search" print and may be an image of an inked impression, an image acquired by an electronic scanning device, or an image of a latent print left at the scene of a crime. Prints stored in electronic form, against which the search print can be compared, are commonly referred to as "file" prints. File prints are typically stored in a database which can associate images of these prints, or other data extracted therefrom, with the identity of individual persons.

The appearance of fingerprints is well known. Closely spaced, generally parallel, "ridges" of friction skin appear black on an inked fingerprint. Often they exhibit a generally circular flow around the center, or "core", of the print. At specific points, a ridge may terminate at a "ridge end" or may divide into two ridges at a "bifurcation". Other morphological events, such as "bridges" and "trifurcations" are known as well, as shown in U.S. Pat. No. 4,752,966, "Fingerprint Identification System" (issued Jun. 21, 1988 to Schiller and assigned to Fingermatrix, Inc.), and U.S. Pat. No. 4,135,147, "Minutiae Pattern Matcher" (issued Jan. 1, 1979 to Riganati et al. and assigned to Rockwell International Corp.), which are both incorporated herein by reference. These morphological events are known as "minutiae", or in the singular, "minutia", and typically number between 50 and 200 on a person's fingers. The disposition of these minutiae across a fingerprint is unique to the individual and to the finger, and as a result, can form the basis for the identification of the individual.

A fingerprint may be represented as a list of minutiae. Such a list of fingerprint minutiae is a highly compressed data representation of the original fingerprint image. Although the minutiae may be identified by a human operator looking at a displayed image of the fingerprint, an automated system is preferable, and typically implements, in very general terms, four steps: i) preliminary image processing, ii) binarization, to turn all dark pixels black and all light pixels white, iii) skeletonization, wherein thick black ridges in the binarized image are "thinned" down to one-pixel thickness, and iv) minutia identification from the skeletonized image.

A fingerprint "matcher" is an automated mechanism for comparing search prints with file prints. A matcher which utilizes minutiae in the comparison compares a representation of the minutiae data from a single search print with that of a single file print. The representation of minutiae data is a list of minutiae and other forms of information. Among these may be the geometric locations of the minutiae in the frame of the image, the orientation of minutiae with respect to the frame of the image, and the relationships of the minutiae between themselves. The functional requirements of a given matcher dictate the format of minutiae data input to the matcher.

Many different fingerprint matchers are known. The most prevalent of these compare search print and file print minutiae, while others use direct optical comparison methods of images as wholes. Fingerprint matchers that compare search and file minutiae generally may be categorized using two discriminants: 1) whether the matcher is "spatial" or "topological" and 2) whether the matcher uses information "local" to minutiae exclusively. These discriminants form a framework for understanding the present fingerprint matcher in the context of those that are known in the prior art.

The first discriminant is whether the matcher is "spatial" or "topological". A purely spatial matcher uses the geometric relationships among minutiae of a print without regard to the identity of ridges which then terminate, bifurcate, or otherwise form a morphological event. The Cartesian coordinates of each minutia are recorded along with an estimate of the angle that each minutia exhibits with respect to the frame of the print image. For instance, the angle of a ridge end can be estimated from a short segment of the dark pixels leading away from the minutia along the ridge. A well-known example of a spatial matcher is described in Wegstein, J. H., "The M40 Fingerprint Matcher," N.B.S. Technical Note 878 (National Bureau of Standards, July 1975), which is incorporated herein by reference.

A topological matcher uses the connectivity of ridges among minutiae to establish relationships among them in a single print. If two ridge ends terminate the same ridge, on which there is no other minutia, then there is a specific relationship between the minutiae that may be exploited by the matcher. This relationship, of being connected by the ridge, holds irrespective of the distance between the minutiae. Examples of topological matchers are discussed in Malcolm K. Sparrow and Penelope J. Sparrow, "A Topological Approach to the Matching of Single Fingerprints: Developments of Algorithms for Use on Latent Fingermarks", N.B.S. Special Pub. 500-126 (National Bureau of Standards 1985); in U.S. Pat. No. 4,747,147 "Fingerprint Recognition System" (issued May 24, 1988 to Sparrow); and in U.S. Pat. No. 4,817,183 "Fingerprint Recognition and Retrieval System" (issued Mar. 28, 1989 to Sparrow). All of these references are incorporated herein by reference. These references show matchers which rely on "ridge counts", which refer to the number of ridges crossed by a line drawn from the core of the print to each minutia.

Not only are spatial and topological matchers known in the art, hybrid forms known as well. A hybrid form of a spatial and topological matcher would use both geometric and ridge information about minutiae. For example, U.S. Pat. No. 4,646,352 "Method and Device for Matching Fingerprints with Precise Minutia Pairs Selected From Coarse Pairs" (issued Feb. 24, 1987 to Asai et al. and assigned to NEC Corp.) discloses a matcher that utilizes relations within pairs of minutiae, and is incorporated herein by reference. To characterize each pair of minutiae, the matcher uses both a local frame of coordinates and the ridge counts between the minutiae.

The second discriminant for categorizing a fingerprint matcher is whether or not it uses information "local" to minutiae exclusively. If a spatial matcher compares the coordinates in the frame of the image of search minutiae to those of file minutiae, that matcher uses "global" information, not information strictly local to individual minutiae. The global information is the reference to the frame of the image. For example, U.S. Pat. No. 4,790,564 "Automatic Fingerprint Identification System Including Processes and Apparatus for Matching Fingerprints" (issued Dec. 13, 1988 to Larcher et al. and assigned to Morpho Systems) shows a spatial matcher that in effect superimposes a rotated and translated set of search minutiae onto a set of file minutiae, and is incorporated herein by reference.

A spatial matcher that uses only local information would construct and use relative geometric relationships within small groups of minutiae, such as pairs. The geometry would be referenced only to a local frame, not to that of the full image, making the matcher less vulnerable to distortions of the skin than a matcher that uses global information. For example, the matcher disclosed in the '352 patent to Asai et al. establishes, for each minutia, four other close minutiae. These are the closest minutia in each of the four quadrants of the frame local to the central minutia. All measurements used for matching between search and file are made between local pairs.

A topological matcher that uses global information uses the location of the core of the fingerprint or a line of symmetry to reference ridge counts for minutiae. The information is referenced to the whole fingerprint morphology. The matchers disclosed in the '147 and '183 patents to Sparrow use such global information to automate as much as possible the matching of latent search prints. Since latent fingerprints left at crime scenes are typically of poor image quality, these matchers are designed to make use of as much information as possible. The location of the core or the line of symmetry provides good registration for minutia data.

Matchers are known that use both local and global relationships of minutiae. For example, the '147 patent to Riganati et al. discloses a matcher that performs a "global coherency analysis" to form a best fit of local relationships across the whole print to determine whether the search print matches any stored file prints.

A matcher must not only compare minutiae of search and file prints, but must also determine, based on this comparison, whether or not the search print matches the file print. Sparrow's LM6 matcher, as disclosed in his '147 and '183 patents, uses a scoring scheme for each matching search-file pair of minutiae, to determine whether the search print matches the file print. Briefly, a given search-file mating of minutiae S0 is linked to other minutiae S1 and bears an initial score derived from those links. Then the other minutiae S1 are themselves linked to yet other minutiae S2. The initial score of S0 is then modified by adding the scores of S1 to S2 links that are compatible" with the S0 to S1 link. Hence, the compatible scores at the S1 level get "pulled in" to S0. Since each of these links is actually a relationship between search minutiae and a separate relationship between file minutiae, the identity of which search minutia is mated to which file minutia can render two links incompatible. Sparrow's LM6 matcher conducts a table sort which enforces such compatibility, thus ensuring the validity of the scoring scheme. Sparrow's LM6 matcher uses the scoring scheme to increase the accuracy of positively identifying a match between search and file prints.

An important objective for a fingerprint matcher is to be robust to any distortions that may exist in the search print. Skin is stretchy, and the disposition of minutiae across the image of the fingerprint is notoriously variable from instance to instance. Fingerprints that are typically digitally acquired and image-processed, may also suffer from several untoward deviations caused by abraided areas of skin, smudged areas on inkings, and optical and sampling limitations of direct sensors. Minutiae apparently "mutate" from ridge ending to bifurcation or vice versa. True minutiae can be missed or false minutiae can appear. An automated fingerprint matcher, when integrated with its image processing, should be robust as much as possible to these problems that inherently arise.

Different types of matchers will exhibit different vulnerabilities to skin distortions and other problems. A spatial matcher is affected directly by geometric distortion, while a topological matcher has mechanisms to walk along with the "ridge flow", regardless of such distortion. If the ridge flow is interrupted, however, the topological matcher will lose track of the ridge that it had been tracing. An important case is when a print is cut off at the edge of the finger (e.g., the tip is missing); the ridges disappear at the edge of the acquired image, causing the topological matcher to lose track of the ridge and is thus unable to use minutiae connected by interrupted ridges in comparing the search print to a file print. A spatial matcher would not be so affected by interrupted ridges caused by partial prints, but is inherently more vulnerable to skin distortions that alter the geometric relationship between minutiae.

Therefore, there exists a need to provide a fingerprint matcher that is robust to many of the uncontrollable factors in either search or file prints, such as smudges, partial prints, distortions in the skin, etc.

SUMMARY OF THE INVENTION

According to the present invention, a fingerprint matcher forms chains of search-file minutia pairings referred to as "hyperladders". The chains are "ladders" by virtue of the "steps" linked together between search and file minutiae, and are "hyper" by allowing one or more "rungs" of the ladder to be shared by different branches of the ladder. Each link in a given chain derives from strictly local relationships on each print. Each chain is formally unlimited in size. The matcher in accordance with the present invention is primarily spatial, but may use topological data such as ridge counts between minutiae as well as geometric (spatial) information.

If a large hyperladder can be constructed from the collection of candidate local relationships on each print then the hyperladder represents a large global association of search and file minutiae. Each step of the hyperladder is local, so the matcher is robust to distortions of the skin and other problems. A large hyperladder successfully links these steps into a large, global-type association of minutiae between the search print and the file print. Hence, a large hyperladder indicates that the search and file prints match. Conversely, if no large hyperladder can be constructed, then no such large association can be made from the steps, and the prints do not match.

BRIEF DESCRIPTION OF THE DRAWINGS

The preferred exemplary embodiment of the present invention will hereinafter be described in conjunction with the appended drawings, where like designations denote like elements, and:

FIG. 5 is a block diagram showing in detail the function of block 30 of FIG. 3, which is the first restriction operation 30 on the table of candidate mated pairs 28;

FIG. 6 is a block diagram showing in detail the function of blocks 32 and 34 of FIG. 3, which are the second restriction operation on the table of candidate mated pairs 28 and the formation 34 of the list of steps 36, respectively;

FIG. 12 illustrates a ladder and a step combined to form a simple hyperladder, with one rung leading to three other rungs;

FIG. 14 is a block diagram showing in detail the function of block 38 of FIG. 3, which builds the table of hyperladders 40 from the list of steps 36;

FIG. 15 is a block diagram showing the function of a procedure in FIG. 14;

FIG. 18 is a block diagram showing the function of a procedure in FIG. 15;

FIG. 20 is a block diagram showing the function of a procedure in FIG. 18.

DETAILED DESCRIPTION OF A PREFERRED EXEMPLARY EMBODIMENT

Figure 1:
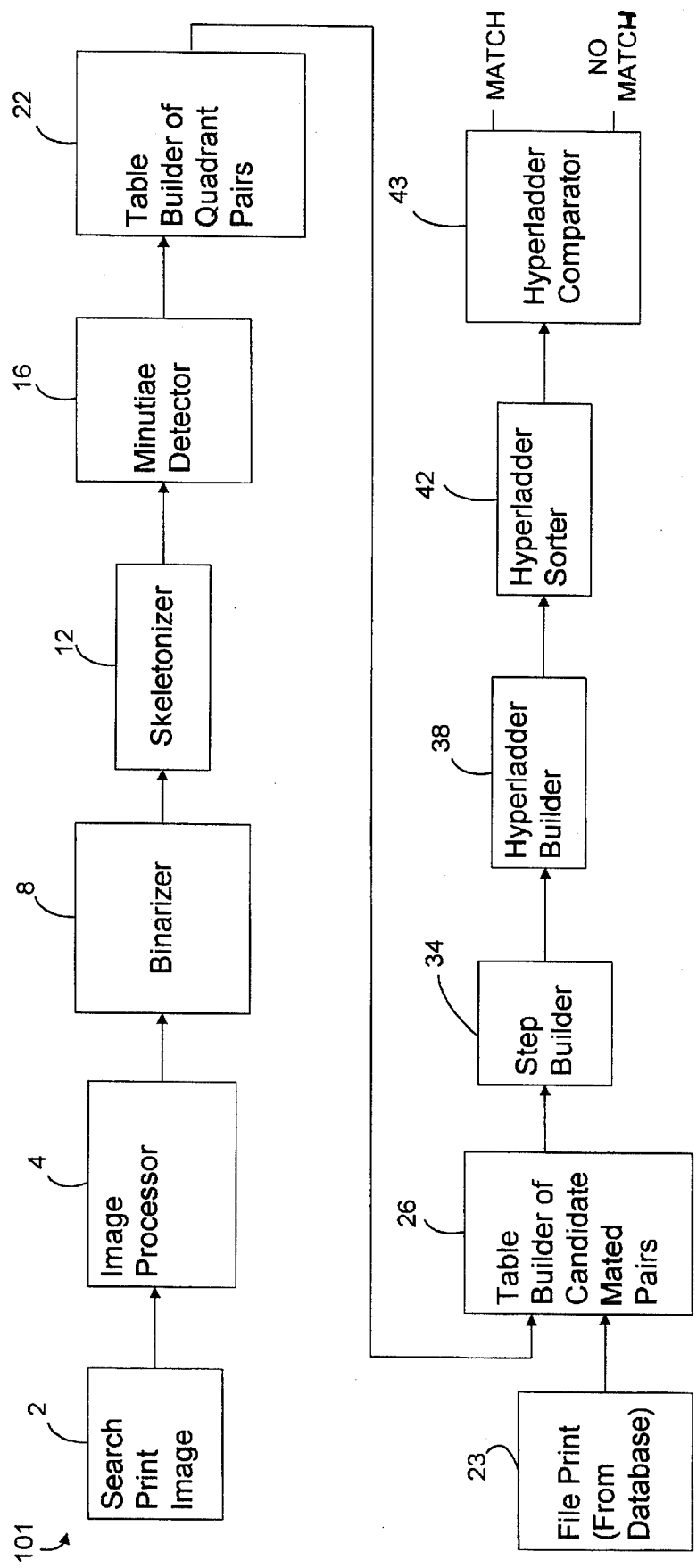
FIG. 1 is a block diagram of the fingerprint matcher in accordance with the present invention.

Referring to the figures, a fingerprint matcher 101 in accordance with the present invention comprises: an image processor 4; a binarizer 8; a skeletonizer 12; a minutiae detector 16; a table builder of quadrant pairs 22; a table builder of candidate mated pairs 26; a step builder 34; a hyperladder builder 36; a hyperladder sorter 42; and a hyperladder comparator 43. The components of fingerprint matcher 101 are coupled together in sequential fashion, as generally shown in FIG. 1, with the final stage (hyperladder comparator 43) indicating whether or not the search print matches the file print. By constructing hyperladders of matching minutiae, fingerprint matcher 101 gains the advantages of topological matchers that use local information relating to neighboring minutiae, which decreases the sensitivity to skin stretching and other variations that can occur between two instances of the same fingerprint. At the same time, fingerprint matcher 101 provides the advantages of a spatial matcher by generating an overall map of matching minutiae from the hyperladder. Thus, while individual minutiae are linked to their neighboring minutiae using local information, the aggregate view of the hyperladder gives a spatial indication of the relationship between minutiae as well.

Figure 1A:
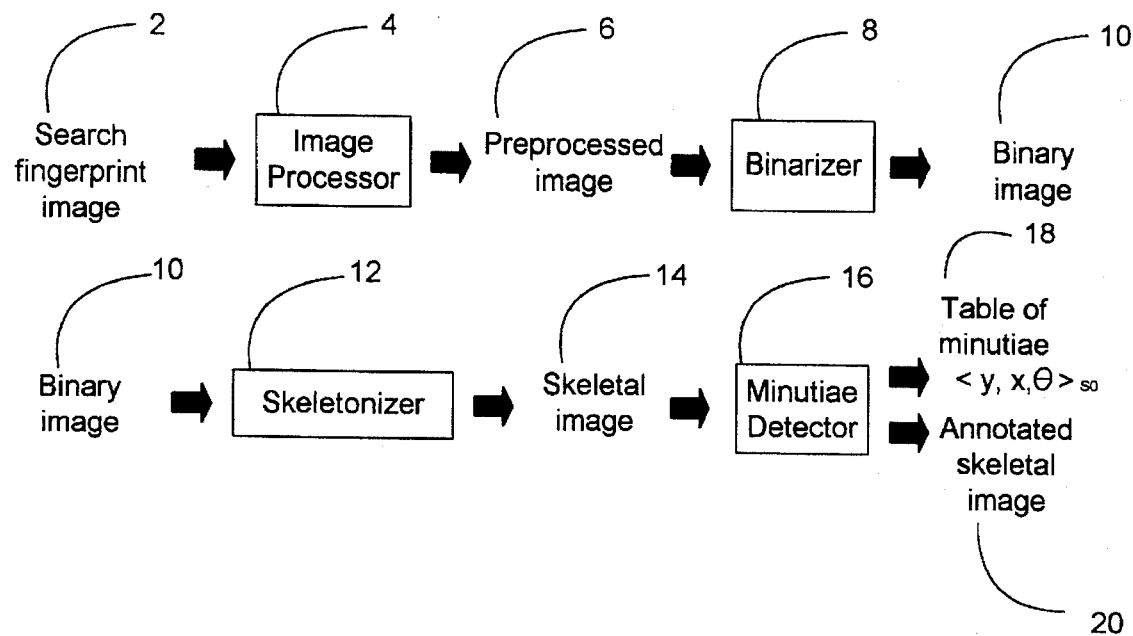
FIG. 1A is a block diagram showing the processing sequence leading to the identification of minutiae.
Figure 2:
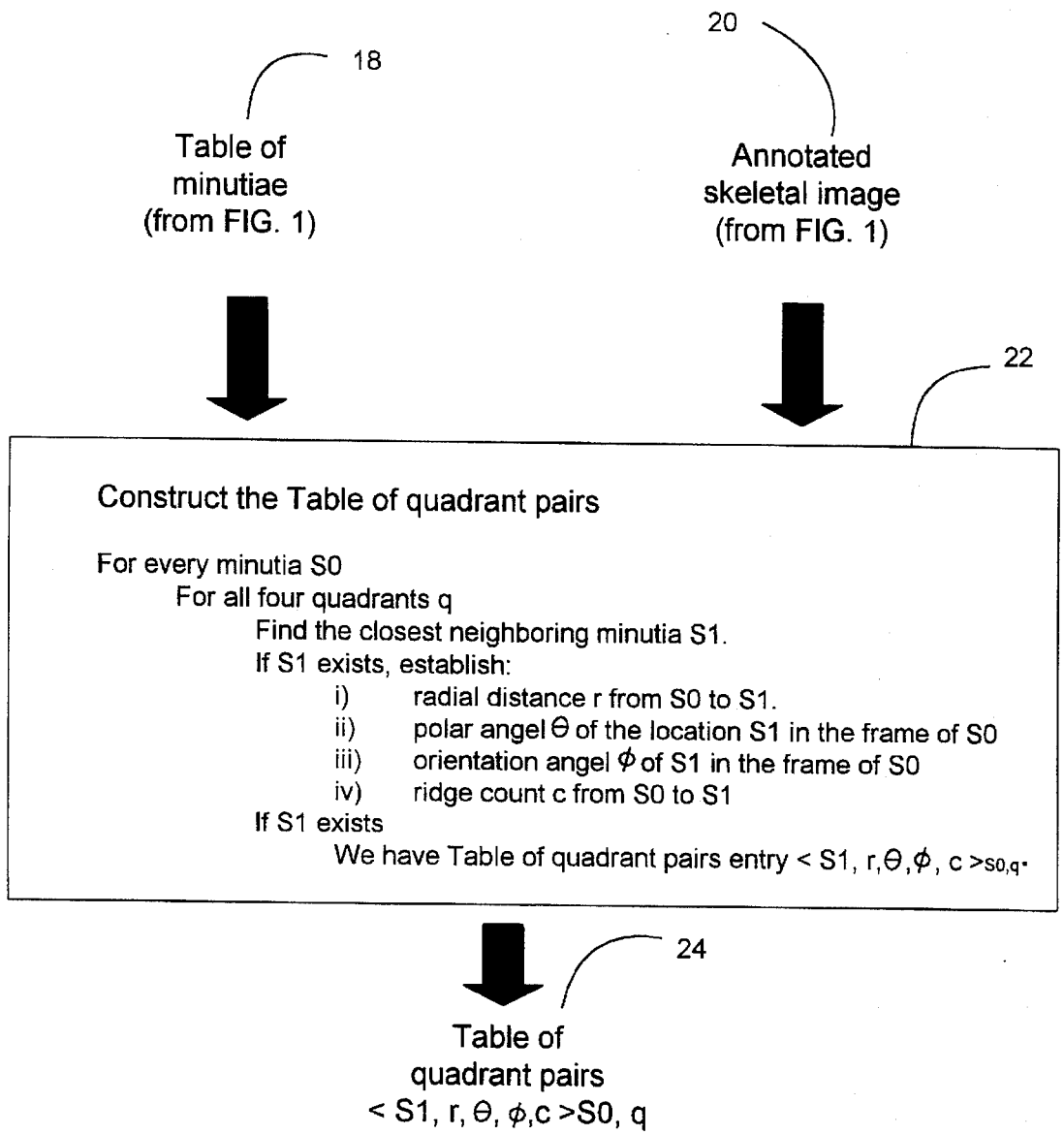
FIG. 2 is a block diagram showing the construction of the table of quadrant pairs for the search print.
Figure 3:
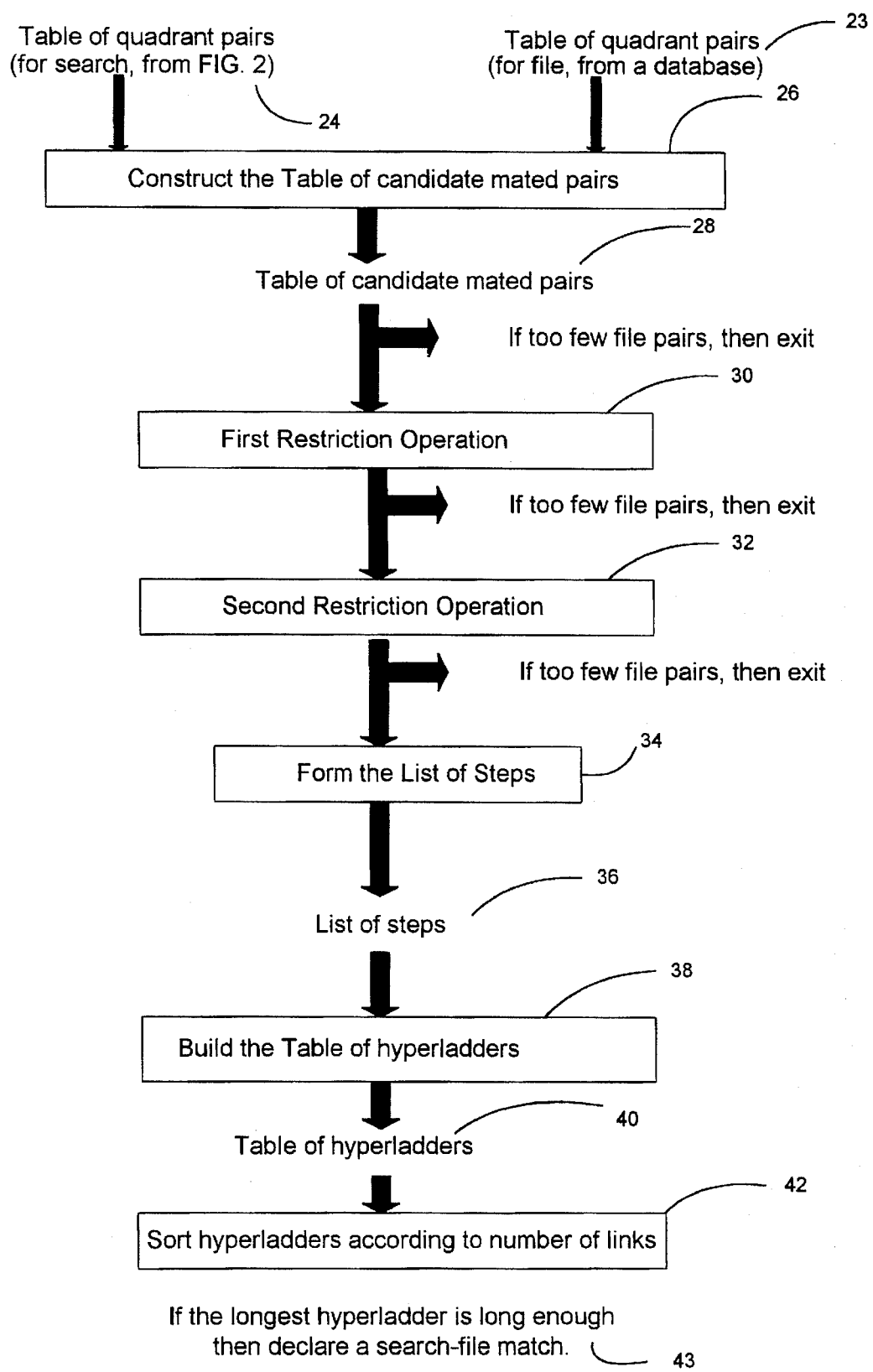
FIG. 3 is a flowchart of the matcher algorithm for receiving the table of quadrant pairs from FIG. 2 for the search print and another table of quadrant pairs from a database for the file print and building hyperladders of the matched pairs.

FIG. 1 shows the components required to match a search print with a file print, while FIGS. 1A, 2 and 3 show the process carried out by the components of FIG. 1, including intermediate steps and results. For example, FIG. 1A shows in more detail the process carried out by image processor 4, binarizer 8, skeletonizer 12, and minutiae detector 16 of FIG. 1. Referring now to FIGS. 1 and 1A, search print image 2 is suitably a gray-scale representation of a fingerprint, such as inked fingerprints. Image processor 4 electronically scans search print image 2 for comparison against a number of file prints 23 stored in a database. Image processor 4 may be a typical optical scanner such as those known in the art, or may be another sensing device capable of generating an electronic image of search print image 2. Image processor 4 performs directional smoothing, filtration and contrast enhancement of search print image 2. The result is a preprocessed image 6 that is generally smoother and clearer than search print image 2. Binarizer 8 then turns all dark pixels black and all light pixels white, to produce a binary image 10 where the ridges are thick and black. Skeletonizer 12 then performs a "thinning" algorithm on the binary image 10 to produce the skeletal image 14. The image is still populated by white and black values, but the thick black ridges now have become as thin as possible. The ridges are represented by one pixel-thick lines of black on a white background, as best as can be constructed within the constraints of the square tile arrangement of typical pixels.

Within skeletal image 14, single thin ridges terminate in "events", each of which presumably corresponds to a minutia. A ridge ending is where a line of black pixels simply stops. A bifurcation is where a line of black pixels divides into two separate lines. Several different pixel arrangements are possible about bifurcations. Unnaturally complicated pixel arrangements may be due to unclear parts of search print image 2 or limitations in skeletonizer 12. Connectivity in skeletal image 14 may therefore reflect minutiae that do not truly exist in the fingerprint represented by search print image 2.

Minutiae detector 16 then identifies those events in the skeletal image 14 which are likely to represent true minutiae. This job would be relatively straightforward if every terminating event were a simple representation of a minutia. Minutiae detector 16 must, however, sort through the occasional complexity of skeletal image 14. For those minutiae that are deemed acceptable, minutiae detector 16 then prepares a table of minutiae 18 containing a list of minutiae. For each minutia the table contains the Cartesian coordinates <y, x> of the minutia location in the frame of the image and the orientation angle theta of the minutia in that frame. The angle is measured by considering some small number of dark pixels about the minutia. There will be a single row of such pixels leading away from each ridge ending. There will be three rows of such pixels leading away from each bifurcation. The combination of coordinates <y,x> and angle theta thus uniquely identifies each minutia.

The table of minutiae 18 as shown in FIG. 1A is a list such that for every minutia S0 there is an entry <y, x, theta>$_{S0}$ (=<y$_{S0}$, x$_{S0}$, theta$_{S0}$>). Table 18 contains all the information needed about individual minutiae on a single print, in this case the search print.

In addition to producing table of minutiae 18, minutiae detector 16 prepares an annotated skeletal image 20. This is an image derived from skeletal image 14 wherein the events that have been identified in table of minutiae 18 are given special values to distinguish them from the black pixels of the ridges and the white pixels of the background.

The output of minutiae detector 16 is fed into table builder of quadrant pairs 22 (FIGS. 1 and 2) to construct a table of quadrant pairs 24 (FIG. 2). Table builder of quadrant pairs 22 establishes a local coordinate frame for each minutia (S0) in table of minutiae 18, with the origin at the minutia and the axes oriented by a convention established by minutiae detector 16. Then in each of the four quadrants of the local coordinate frame we find the closest neighboring minutia (S1). For minutiae S0 which are near an edge of the image, one or more quadrants may have no neighbors S1, so these quadrant entries remain empty for such S0. Of course, if there are at least two minutiae in the image then at least one quadrant of each minutia S0 must have a closest neighbor S1. For those quadrants (q) of S0 that have an S1 we calculate the polar coordinates of S1 <r, theta> and the orientation angle phi of minutia S1 in the frame of S0. We determine also the ridge count c between S0 and S1, the number of ridges crossed by a straight line drawn between them. In order to determine the ridge count we use the annotated skeletal image 20.

The table of quadrant pairs 24 is shown in FIG. 2 as a list such that for every minutia S0 and every quadrant q in the local frame of S0 there may be an entry <S1, r, theta, phi, c>$_{S0,q}$. Table 24 contains all the information we need about pairs of minutiae on a single print, in this case the search print.

Next, table builder of candidate mated pairs 26 receives the table of quadrant pairs 24 for the search print, and also accesses a database of tables of quadrant pairs for file prints. These tables for file prints have been constructed previously by applying, to the corpus of file prints, the processing steps described to this point for the search print. The database also records the identities of the individuals and fingerprints for its data. The matcher iteratively compares the table of quadrant pairs 24 for the search print with a table of quadrant pairs 23 for a particular file print stored in the database and provides an indication of search-file mates as well as confidence ratings for these mates.

Figure 4:
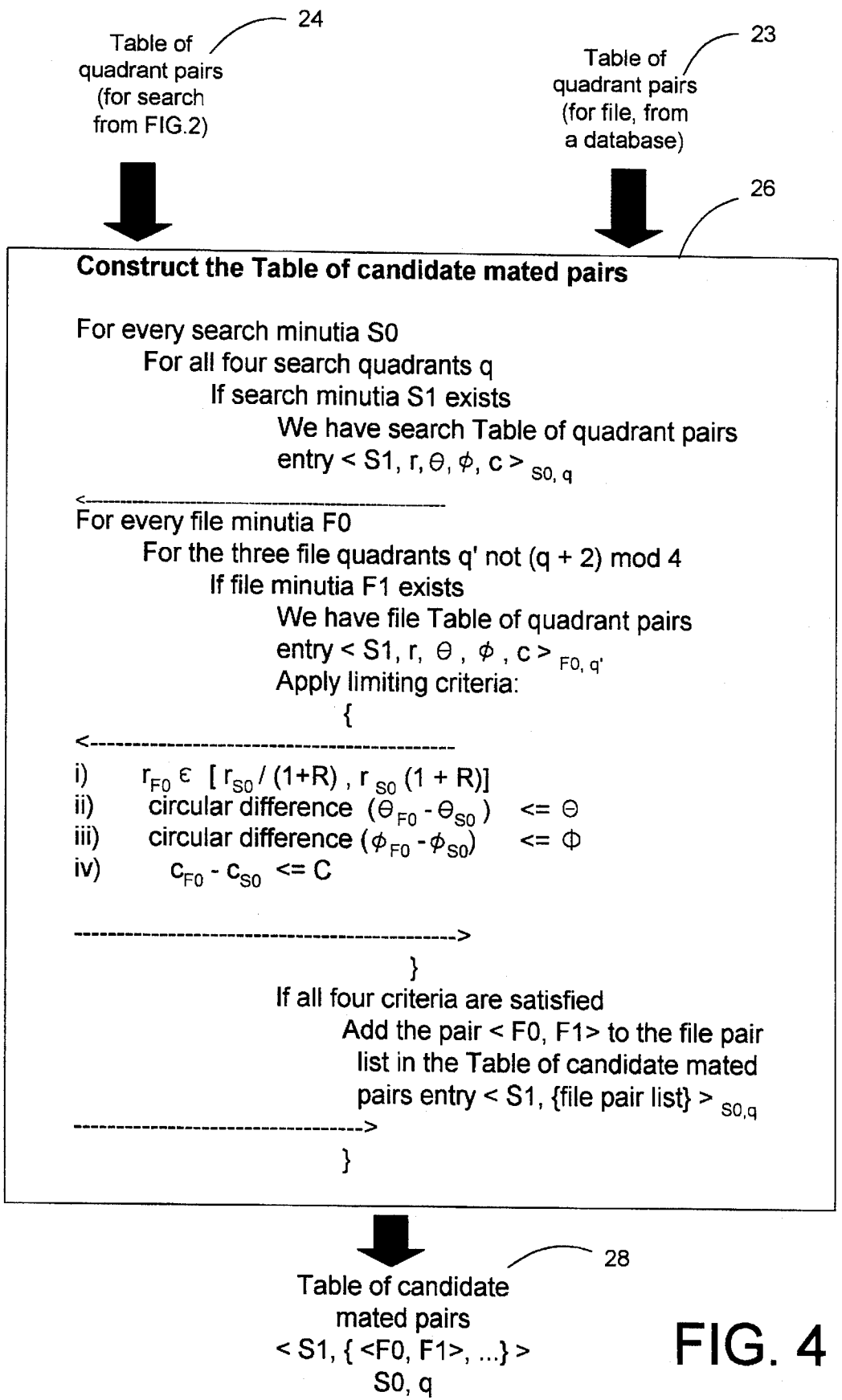
FIG. 4 is a block diagram showing in detail the function of block 26 of FIG. 3, which constructs the table of candidate mated pairs 28 from the tables of quadrant pairs for search 24 and file 23.

FIGS. 1 and 3 show the flow of the operation of matcher 101 once tables are available for both search and file prints. Given the table of quadrant pairs 24 for the search print, for each table of quadrant pairs 23 corresponding to a file print in the database, table builder of candidate mated pairs 26 constructs a table of candidate mated pairs 28. FIG. 4 shows the construction of table of candidate mated pairs 28 in detail. Several loops are involved. Consider the input tables of quadrant pairs for both search 24 and file 23 prints. Table builder of candidate mated pairs 26 (FIG. 1) must determine which entries in search table 24 can be associated with which entries in file table 23.

For each search minutia S0 and for each of the four quadrants q we may or may not have an entry for the closest search minutia S1. Then for each file minutia F0 we have a collection {F1} of from one to four file minutiae. Each pair of search minutiae <S0, S1> has a set of four numbers <r, theta, phi, c>$_{S0,q}$, as does each pair of file minutiae <F0, F1>. To determine whether the search pair <S0, S1> can be associated with the file pair <F0, F1> we apply the following tests as predetermined limits to all four numbers:

i) The file radial distance r, from F0 to F1, must be within a given tolerance of the radial distance of corresponding minutiae in the search print, as measured by a fractional distance tolerance R:

$$r_{F0} \text{epsilon } [r_{S0}/(1+R), r_{S0}(1+R)].$$

An appropriate selection of the fraction distance tolerance would be R=0.18.

ii) The file polar angle theta, from F0 to F1, must be within a given circular difference (i.e., angular tolerance) of the angle of corresponding minutiae in the search print, as measured by an absolute angle tolerance THETA:

$$|\text{circular difference } (\text{theta}_{F0} - \text{theta}_{S0})| <= \text{THETA}.$$

An appropriate selection of the polar angle tolerance would be THETA =24°.

If THETA were set to zero, the file minutia F1 must lie in the same "quadrant" q relative to F0 as S1 does relative to S0. With a reasonable positive tolerance 0<=THETA<pi/2, we know that the file quadrant is one of three quadrants. Given that the search quadrant is q, we can skip the file "back quadrant", (q+2) mod 4, in considering file pairs.

iii) The file angle phi, the orientation of F1 in the frame of F0, must be within a given angular tolerance of the angle of corresponding frame S1 in the search print, as measured by an absolute angle tolerance PHI:

$$|\text{circular difference } (\text{phi}_{F0} - \text{phi}_{S0})| <= \text{PHI}.$$

An appropriate selection of the orientation angle tolerance would be PHI=2 THETA=48°.

iv) Finally, the ridge count c between F0 and F1 must be within an integer count tolerance to that of the search print, as measured by a maximal ridge count tolerance C:

$$|c_{F0} - c_{S0}| <= C.$$

An appropriate selection of the ridge count tolerance would be 2 ridges.

If all four conditions are satisfied, then we make an entry in the table of candidate mated pairs 28. Table 28 is a list such that for every search minutia S0 and every quadrant q in the local frame of S0 there may be a search minutia S1 and a list of file pairs {<F0, F1>, ... }. The search minutiae S0 and S1 are extracted directly from table of quadrant pairs 24. The file pairs {<F0, F1 >, ... } are all those pairs that pass these four criteria.

Entries in table of candidate mated pairs 28 are shown in FIG. 4 as being of the form:

$$<S1, \{<F0, F1>, \dots \}>_{S0,q}.$$

Search minutia S0 and quadrant q may be thought of as the independent parameters, and the rest as dependent. Apart from the retention of the search quadrant, table 28 now eschews all information about the spatial and topological relations among search minutiae and, separately, among file minutiae. Table 28 contains all the information we need from this point forward about the potential matings of search minutiae with file minutiae.

Returning now to FIG. 3, if there are too few file pairs residing in the table of candidate mated pairs 28 at this point, then we know that the search and file prints will not match. FIG. 3 shows that we exit in this case after block 26; the matcher loops to the next file print. Exiting here is not unusual for normal choices of parameters when the prints are not from the same finger (i.e., do not match).

Following the creation of the table of candidate mated pairs 28 in FIG. 3, two restriction operations are performed on table 28, which are shown in detail in FIGS. 5 and 6. Both of these operations remove some file pairs <F0, F1> from the Table. The best way to describe the operations is to state the conditions that allow a file pair <F0, F1> to survive in table 28. If the file pair does not satisfy the condition then the file pair gets eliminated.

For the first restriction operation, block 30 of FIG. 5, consider a file pair <F0, F1> appearing in a list of file pairs for search minutia S0 at quadrant q. If the file pair is to survive in table 28 then the (first) file minutia F0 must appear (as the first minutia) in at least one other file pair <F0, F2> in some other quadrant q' for S0:

$<S1, \{<F0, F1>, \ldots \}>_{s0,q}$ $<S2, \{<F0, F2>, \ldots \}>_{s0,q'}.$

In this way the candidate mating of S0 and F0 must be "confirmed" by appearing in at least two quadrants of S0.

Again, if there are too few file pairs residing now in table 28 of candidate mated pairs 28, as restricted at this point, then we know that we cannot have a match. FIGS. 3 and 5 show that we exit in this case after block 26; the matcher loops to the next file print. Exiting here, when the prints are not from the same finger, is more likely than at that opportunity to exit above.

For the second restriction operation, block 32 of FIG. 6, again consider the file pair that has so far survived in table 28. There are two alternatives of the second restriction operation, the "strong" form and the "weak" form. The strong form of the second restriction operation requires that the second file minutia F1 appear as the first minutia in a file pair for S1:

$<S1, \{<F0, F1>, \ldots \}>_{s0,q}$ $<S2, \{<F1, F2>, \ldots \}>_{s1,q'}.$

In this way the candidate mating of S1 and F1 must be confirmed by appearing in at least two table entries, one wherein S1 is the "second" minutia (in <S0,S1>) and one wherein S1 is the "first" minutia (in <S1,S2>). Hence, in the parlance of hyperladders below, two "steps" have been constructed, one toward S1 and one away from S1. This could be referred to as a single "stride through" S1.

In some cases the strong form of the second restriction operation may be perceived as too severe, requiring a less stringent, or "weak" form, as shown in FIG. 6. In our nomenclature of above, <F0, F1> can survive because we can step away from S0, stride through S1 to an S2. But the file pair <F1, F2> that enables us to complete the stride to S2 may itself not be part of a stride through S2 to an S3. We must be careful not to eliminate file pair <F1, F2>. Hence for the preferred weak form of the second restriction operation, block 32 of FIG. 6 shows that, when we find a file pair <F1, F2> that enables us to stride through S1, we mark both file pairs of the stride <F0, F1> and <F1, F2> as "Do not eliminate". Then on another pass through the entire table 28 every file pair that has not been so marked gets eliminated. In this way we preserve both the first and second steps of every stride possible.

Again, if there are too few file pairs residing now in table 28, as restricted at this point, then FIGS. 3 and 6 show that the process exits after block 32. Exiting here is very likely when the prints are not from the same finger.

The next operation shown in FIG. 3, and again in detail in block 34 of FIG. 6, simplifies the table of candidate mated pairs 28 into a list of steps 36. For list 36 we eschew information about quadrants and we no longer organize according to search minutia. List 36 is simply a list of steps, 4-tuples of the form $\{<S0, S1, F0, F1>, \ldots \}$, one entry for each of the file pairs that has survived in table 28. List 36 contains all the information we need to construct hyperladders.

Step builder 34 (FIG. 1) assures that each step built is unique. For a given search pair <S0, S1> there may be several file pairs $\{<F0, F1>, \ldots \}$. But there can be only one 4-tuple entry <S0, S1, F0, F1> in list 36. Indeed, the entry is unique to permuting the order in which the minutiae appear. Given search pair <S0, S1> we know that S1 is the closest neighboring minutia to S0 in some quadrant of S0. But there may or may not be a corresponding search pair <S1, S0> available from table of quadrant pairs 24, since the relationship of being the closest neighbor in another minutia's quadrant is not reciprocal. Hence, an entry <S1, S0, F1, F0> in list of steps 36, if it existed, would be distinct from the entry <S0, S1, F0, F1>.

List of steps 36 is then input to hyperladder builder 38, which constructs a table of hyperladders 38 from list of steps 36. The purpose of constructing hyperladders is to associate the most number of search-file candidate mates as possible in a single structure. Each mated couple in the structure has been related to some other mated couple in the structure by the geometric and topological tests that have been applied up to this point. The tests ensure that each mated couple is related locally to at least one other. A hyperladder extends, where possible, the local adherence to these tests to a more global association.

Figure 7:
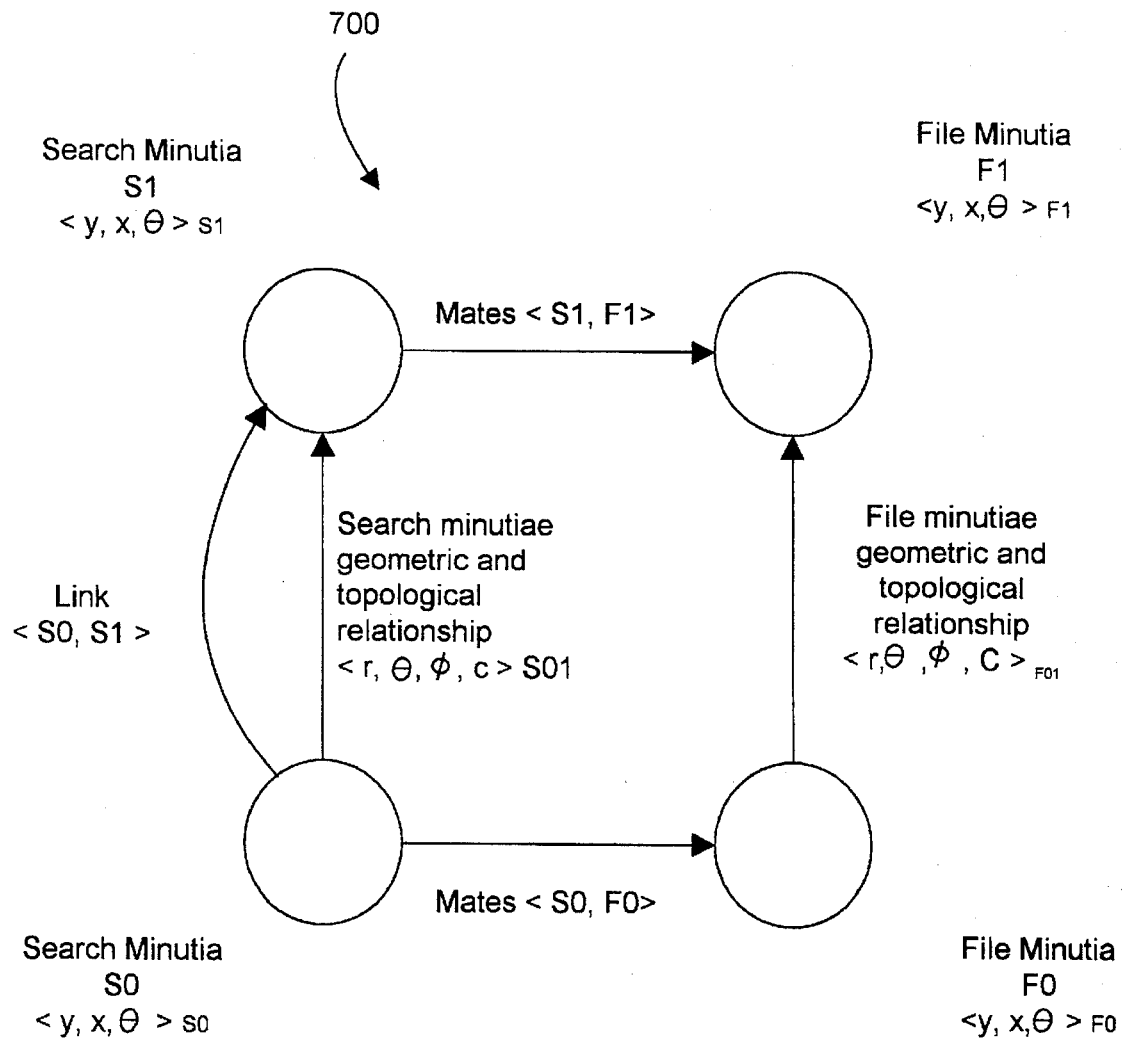
FIG. 7 illustrates the geometric, mate and link relationships among two search and two file minutiae, all forming one step in the list of steps 36 or in a hyperladder.
Figure 8:
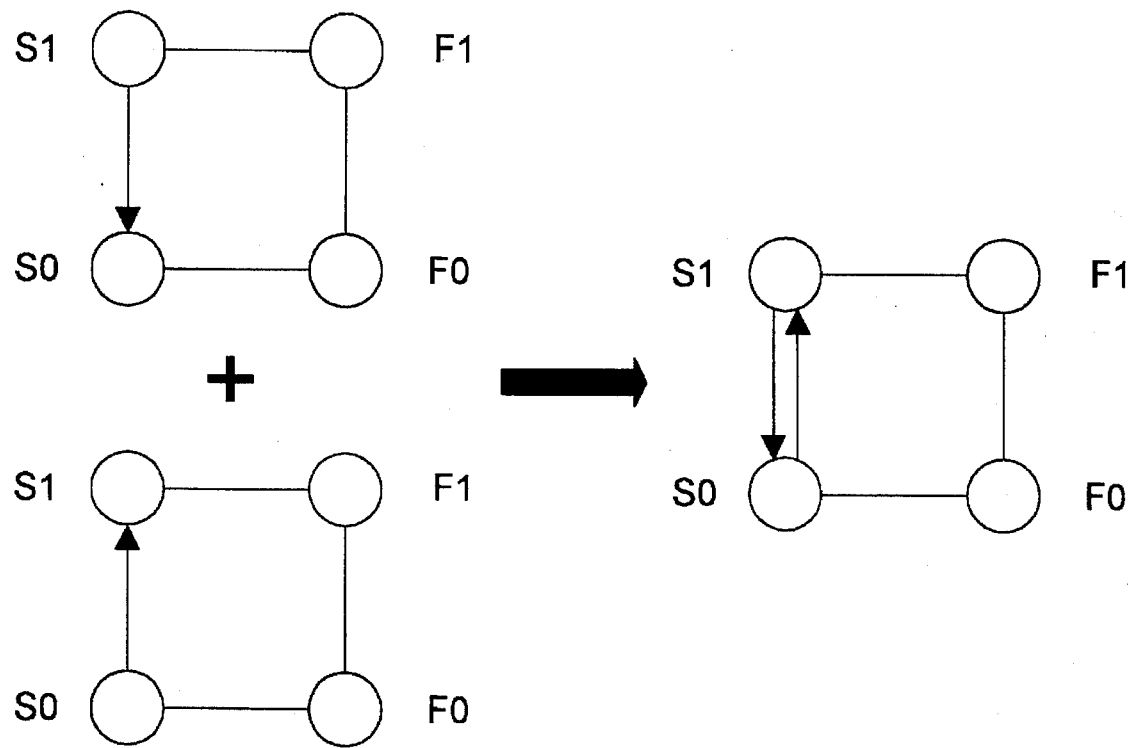
FIG. 8 illustrates two steps consisting of identical minutiae but with different link directions combined to form a single step with both link directions stored.

The unit of construction of hyperladders is the entries of list of steps 36 known as "steps" in the ladder. All the relationships among the four minutiae in a single such step 700 are shown in FIG. 7. Search minutia S0 is represented at the lower left. It is located in the image at Cartesian coordinates <y, x> and is oriented in the frame of the image at an angle theta, all indicated by a 3-tuple $<y, x, theta>_{s0}$. Search minutia S1 is represented in the upper left, with 3-tuple $<y, x, theta>_{s1}$. Minutiae S0 and S1 have a geometric and topological relationship defined by a 4-tuple $<r, theta, phi, c>_{s01}$, forming the left hand "riser" of the step. Similarly, file minutiae F0 and F1 are represented on the right hand side of the step. Minutiae S0 and F0 are related as mates <S0, F0>, forming the lower "rung". Mates <S1, F1> form the upper rung. The link <S0, S1> also forms the left hand riser.

A step in list of steps 36 contains, as we have seen, only the 4-tuple of the identities of the search and file minutiae. We need not maintain in list 36 the coordinate, orientation or minutia-pair relationship information shown in FIG. 7. We do, however, maintain the order of the search (or file) minutiae, as we have seen above.

Similarly, a "step" in a hyperladder appears as three 2-tuples: two "mates" and one link. In FIG. 7 these would be mates <S0, F0> and <S1, F1>, and link <S0, S1>. The connectivity implies of course that we need not maintain a "link <F0, F1>". In English the plural form "mates" could refer to i) those minutiae of a single 2-tuple, or ii) a list of such 2-tuples, or even iii) the corpus of all minutiae appearing in such a list. Hence we prefer the more informal but less ambiguous term "rung" when speaking of the mates of a single 2-tuple.

For the preferred embodiment in accordance with the present invention, the direction of the link in a hyperladder step is inconsequential. We will see that a link <S0, S1 > is functionally equivalent to a link <S1, S0 >.

A hyperladder is a series of steps connected at their rungs. Hence, a hyperladder is specified completely by a list of mates (rungs), each of which is a 2-tuple, and a list of links, each of which again is a 2-tuple. Hyperladder must obey these rules:

i) A given search minutia must appear among the mates only once.

ii) A given file minutia must appear among the mates only once.

iii) Every search minutia appearing in the mates must appear in the links.

iv) Every minutia appearing in the links (which contain only search minutiae) must appear as a search minutia in the mates.

v) Finally, all the links must be connected into one big chain.

Rules i) and ii) ensure that there is no conflict among the matings between search and file minutiae. For example, we must not have a single search minutia mated to two different file minutiae, or a single file minutia mated to two different search minutiae.

Rules iii) and iv) ensure that the list of mates and the list of links include exactly the same corpus of minutiae. For example, we must not have some mated couple that is not linked. Likewise, we must not have some link that contains a (search) minutia that does not appear among the mates.

Rule v) ensures that the hyperladder is not "disconnected" into two or more parts, where there is no link between. Such a disconnection would mean that we would have really two distinct hyperladders instead of a single, fully connected one.

These five rules may be broken of necessity during construction of a hyperladder. In particular, the last rule, insisting on connectivity within a hyperladder, must be violated temporarily at points in the construction when changes are being introduced. Nevertheless, a fully constructed hyperladder must be fully interconnected and must adhere to all the rules.

The rules listed above apply to a single hyperladder. However, note that there may be several hyperladders, some of which may have some but not all minutiae in common among themselves, which can be constructed from a given list of steps 36. While there can be no conflicting mates within a single hyperladder, mates between hyperladders may indeed "conflict".

For example, suppose that list 36 contains both steps <S0, S1, F0, F1 > and <S0, S1, F0, F2 >. This would happen if file minutiae F1 and F2 lie in adjacent quadrants of F0 and are relatively close to each other. A hyperladder containing the first step could not contain the second, since the file mate of S1 would not be unique. But we want to maintain the possibility of having both steps express the search-file mates. We want to postpone making judgements about which matings are correct until we have accounted for all the steps. For this reason we will maintain one hyperladder containing the first step, another containing the second.

Hence, hyperladder builder 38 constructs a table of hyperladders 40, instead of a single hyperladder, from list of steps 36. We describe the construction presently, starting with simple examples. Table of hyperladders 40 starts out empty. Therefore we simply install the first step as the first hyperladder, similar to step 700 of FIG. 7. A single step is the simplest hyperladder. Throughout the following discussion relating to the construction of hyperladders, recall that a single 4-tuple step from list 36 is stored as two 2-tuples for mates and one 2-tuple for the link.

Figure 9:
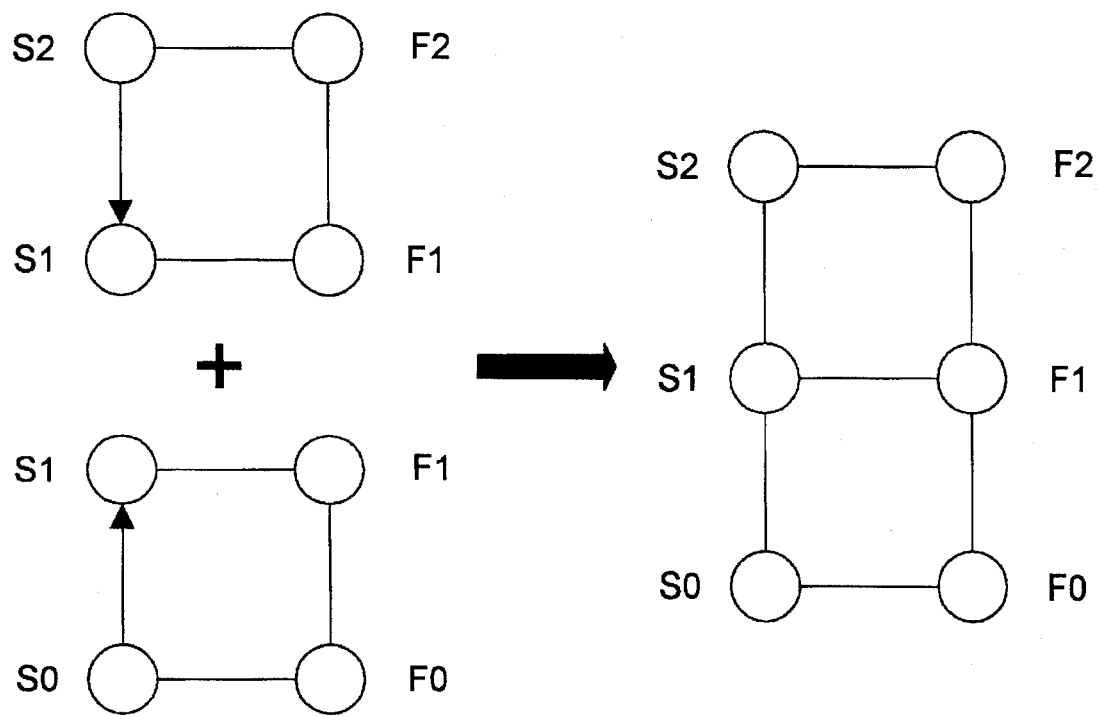
FIG. 9 illustrates two steps combined to form a simple ladder.
Figure 10:
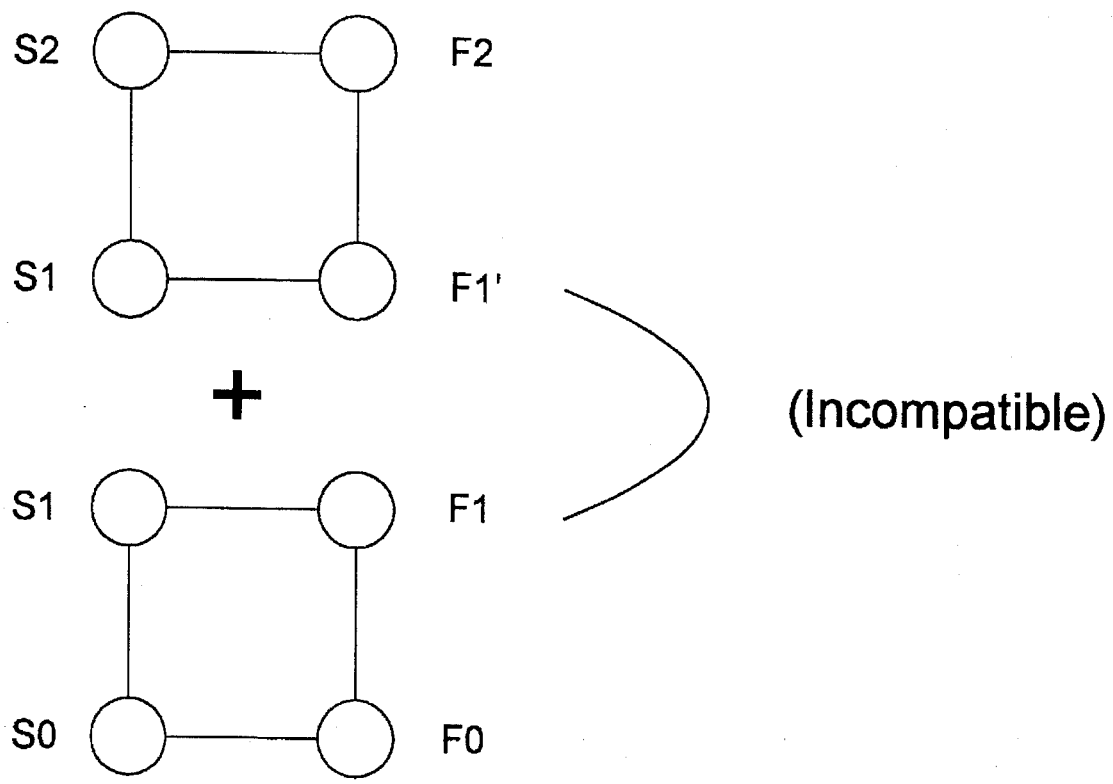
FIG. 10 illustrates two steps that have a conflict at the rungs that might have joined them, and as a result, cannot be combined into a ladder.
Figure 11:
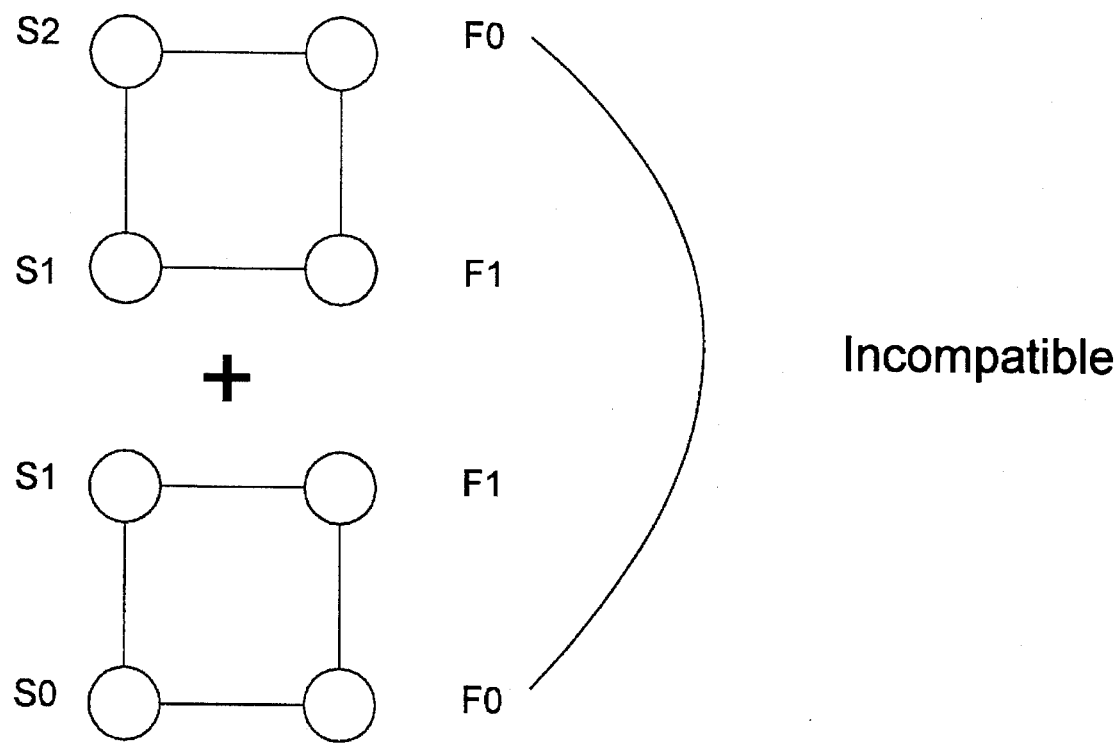
FIG. 11 illustrates two steps that have a rung in common but have a conflict at their other rungs, and so cannot be combined into a ladder.

Now comes a second step. Several cases may arise:

i) Identical Minutiae: FIG. 12 shows two steps with identical minutiae. This is a trivial case in that the steps differ in only the direction of their links. We have noted that these two steps will be distinct entries in list of steps 36. When combined into a new hyperladder each step contributes its link. So the new hyperladder stores two links, but consists really of just one step. Table of hyperladders 40 is left with the one (new) hyperladder. In this preferred embodiment, since the direction of a link within a hyperladder is inconsequential, we need not indicate the direction of each link. One or both links between pairs of search minutiae is sufficient to mean that the minutiae are "linked".

ii) Identical Rung—No Conflict: FIG. 9 shows the construction of the simplest two-step hyperladder. One rung of each step is identical, and the other rungs do not conflict. We connect the steps at the common rung. We are left with a table of hyperladders 40 with the single hyperladder consisting of three search-file mated couples and two links. This is the simplest "ladder", as such. Note that in this and all subsequent hyperladder figures we no longer indicate the direction of links.

iii) Incompatible Shared Rung: FIG. 10 shows incompatible or conflicting steps that cannot form a larger hyperladder. We are left with a table of hyperladders 40 with two hyperladders, each a single step.

iv) Compatible Shared Rung—Conflict in Other Rungs: FIG. 11 shows steps that, while having a rung in common, nevertheless cannot form a larger hyperladder because of the conflict between the other rungs. Again we are left with two single-step hyperladders.

v) No Common Minutiae Between Steps: We might have no minutiae in common between the steps, in which case we again have two hyperladders in table 40.

Figure 13:
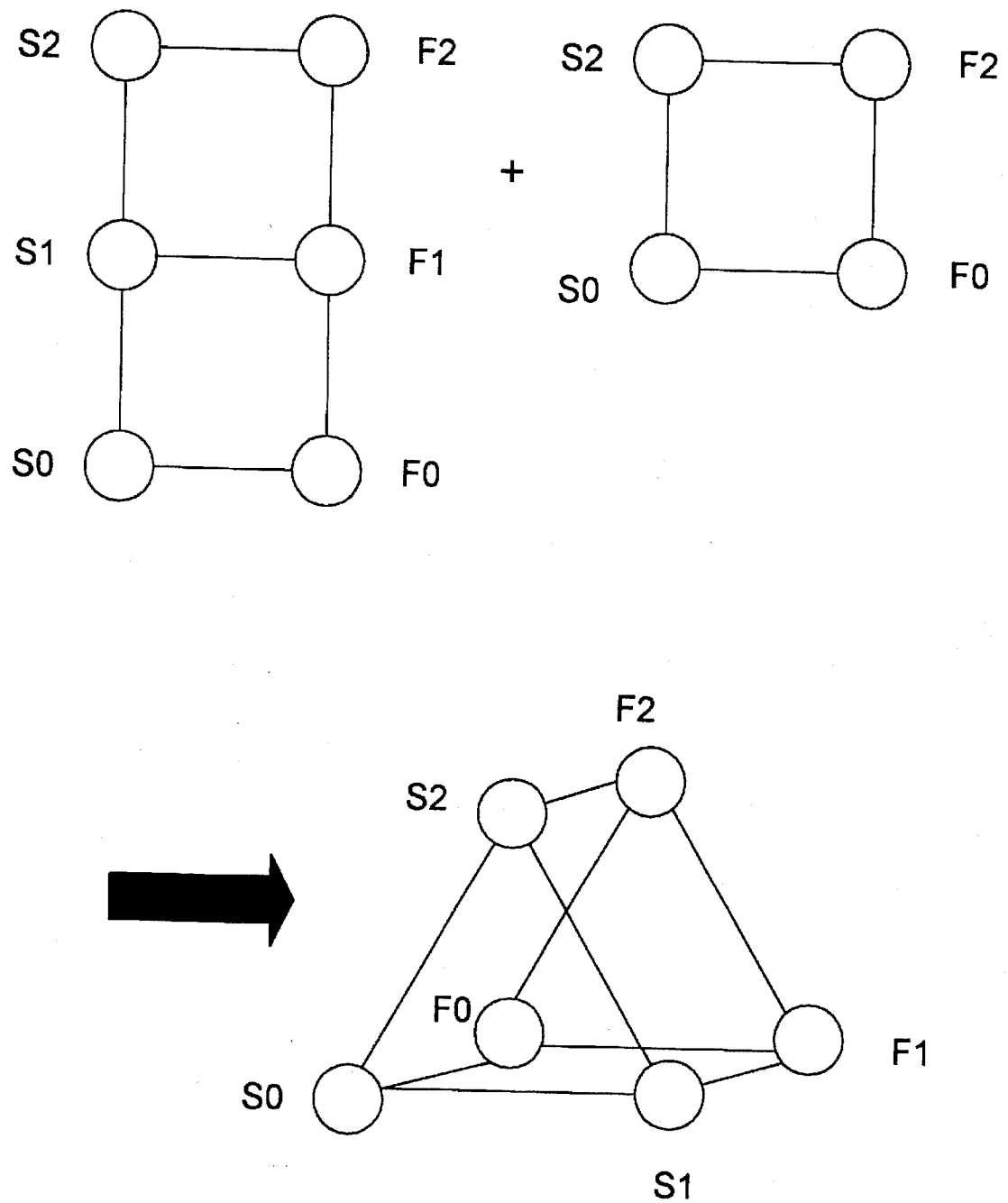
FIG. 13 illustrates a hyperladder and a step combined to add a new link within the hyperladder without adding a new rung.

Now comes a third step, which may also give rise to several possible cases. The two most interesting are:

i) FIG. 12 shows a step that has been attached to the center rung of a two-step hyperladder. Hence, the center rung is connected to three other rungs. This is the simplest "hyperladder", as such.

ii) FIG. 13 shows the new step connecting the top and bottom rungs of the two-step hyperladder, forming a triangular structure.

In the preferred embodiment as illustrated in FIG. 12, each search minutia or rung can have a maximum of four other search minutiae or rungs to which it is linked. Hence there are a maximum of four links in a hyperladder leading away from a given rung. An example like that of FIG. 12 might show four rungs being linked to the center rung <S1, F1 >. Note, however, that the number of links to a given rung is a function of the way table builder of quadrant pairs 22 defines table of quadrant pairs 24. Thus, if more than four neighboring minutiae were to be accommodated in table 24, then there would be correspondingly more links that could lead away from a given rung. For example, if table builder of quadrant pairs 22 relates minutiae in six zones rather than four quadrants, hyperladder builder 38 could construct a hyperladder that has up to six rungs linked to a given rung.

FIG. 14 shows one example of the specific steps used by hyperladder builder 38 to construct table of hyperladders 40. To avoid confusion, terms in the figures are labeled with numbers. Among those terms that are labeled are the prepositions "if" and "for", the conjunction "else" and various significant verbs.

Hyperladder builder 38 constructs hyperladders in accordance with specific methods and constraints, as illustrated more particularly in FIGS. 14, 15, 18 and 20. To construct table of hyperladders 40 from list of steps 36, hyperladder builder 38 has a large outside loop 1000 over all the steps (FIG. 14). Within this loop there is another loop 1100 over all the "original" hyperladders existing in table 40 before the step is applied. If 1500 a given step cannot be connected to any of the original hyperladders then the step itself is entered 1600 into table 40 as a new hyperladder. This is the situation when the first step is considered, as well as when cases arise like those shown in FIGS. 10 and 11. Otherwise, if a given step can be connected to at least one of the original hyperladders then we do not add the step itself as a new hyperladder, since we are able to form one or more "larger" new hyperladders. FIGS. 9, 12 and 13 show examples of these cases, although the hyperladder constructed in FIG. 13 is not "larger" in terms of the number of rungs than the original.

For reasons discussed below, when we can connect the step we need usually to keep the original hyperladder intact. Hence, in a typical case where we can connect the step, we make a new copy of the original hyperladder, connect the step to the copy and enter the new hyperladder into table 40. More complex cases can give rise to several new hyperladders added. These additions of new hyperladders do not, however, affect the loop over the original hyperladders. New hyperladders are added at the end of table 40, past the iteration over these original ones.

Before the end of loop 1000 over the steps, table of hyperladders 40 contains the original hyperladders plus all the new ones that have just been formed with the latest step. In order to reduce the proliferation of hyperladders for subsequent loop iterations, hyperladder builder 38 eliminates 1800 redundancy in table 40. Every hyperladder that is a subset of another gets eliminated from table 40. In order to speed this process, hyperladder builder 38 sorts 1700 the hyperladders in table 40 according to the number of links they contain. Then hyperladder builder 38 eliminates 1800 redundant hyperladders by comparing iteratively small hyperladders from the end of table 40 with large hyperladders from the beginning.

At the end of loop 1000 over the steps there are two cut-out tests which cause hyperladder matcher 43 to declare obvious fingerprint matches without having to construct extremely large hyperladders. If 1900 the hyperladder with the largest number of links has at least 100 such links, then the search-file prints should be an obvious match. We terminate 1910 the loop 1000 here immediately. Likewise, there are two locations deeper within the algorithm wherein the Table of hyperladders is declared 1410 "full". If 1920 so then we again terminate 1930 the loop 1000 immediately.

Returning now to loop 1100 over the original hyperladders in table 40, we are given now a step and an original hyperladder. We inquire first about the rungs in the step. If 1200 the two step rungs both appear as rungs in the hyperladder then we connect 1300 the step to the hyperladder. Since both step rungs appear already in the hyperladder we add simply a new link. This is a generalized version of the operation seen in FIG. 13. This is the one case wherein we change the original hyperladder without bothering to copy it. No new minutiae are being added, so there is no possibility here of introducing a conflict among mates in the hyperladder.

If 1400 on the other hand one, but not the other, of the step rungs appears in the hyperladder, then we should be able to connect the step to the hyperladder at that rung. We call that rung "bound" to the hyperladder, and the other rung "free" from the hyperladder. Since the free rung may conflict with another rung in the hyperladder we need to maintain for now the original hyperladder intact, without the connection of the step. We need to preserve the already established connectivity from the bound rung to the rung that would conflict with the free rung. This is why we are careful to make a new copy of the original hyperladder before we attempt to connect the step. As we have seen above, we need not make such a new copy when both rungs appear already in the hyperladder.

The exposition of the algorithm now goes deeper, as shown in FIG. 15, wherein all the loops and conditionals of FIG. 14 inside test 1400 still apply. Remember that somewhere in FIG. 15 or deeper, a flag may be raised such that table of hyperladders 40 is declared 1410 "full", ready for a cut-out from loop 1000, as noted above.

Referring now to FIG. 15, we have a step and an original hyperladder. Call the original hyperladder "HLi". The bound rung is in HLi, the free rung is not. We make 2000 a copy of the original hyperladder, HLi'. We first must inquire 2100 whether the free rung conflicts with some other rung in the hyperladder. If there is such a conflict, then one or both of the mated minutiae in the free rung is the source of the conflict. If 2200 the search minutia already has some other file mate in the hyperladder then we say that the search minutia conflicts. If this is the case then we remove 2210 all references in HLi' to the search minutia. Since HLi' is a copy of the original hyperladder we need not worry that we would be destroying connectivity among rungs that we have already established.

In order to remove 2210 all references to a search minutia from the hyperladder, we eliminate the single mated couple or rung in which the minutia appears (as a search minutia) and we eliminate all the links in which the minutia appears. This process will be seen to be necessary and sufficient to eliminate conflict within the hyperladder to the presence of the search minutia in the free rung. We can call this "resolving" the conflict.

Now note that removing 2210 all references to a search minutia may completely unravel the hyperladder. Since links are destroyed there may be collections of rungs which are no longer linked to each other, violating the connectivity rule for hyperladders. This is a temporary condition in the construction of the hyperladder that started out as a copy of the original. The condition will be rectified shortly. Indeed, there may be no links left at this point, in which case the hyperladder as such really has disappeared. We may have a disconnected or empty hyperladder at this point.

Figure 16:
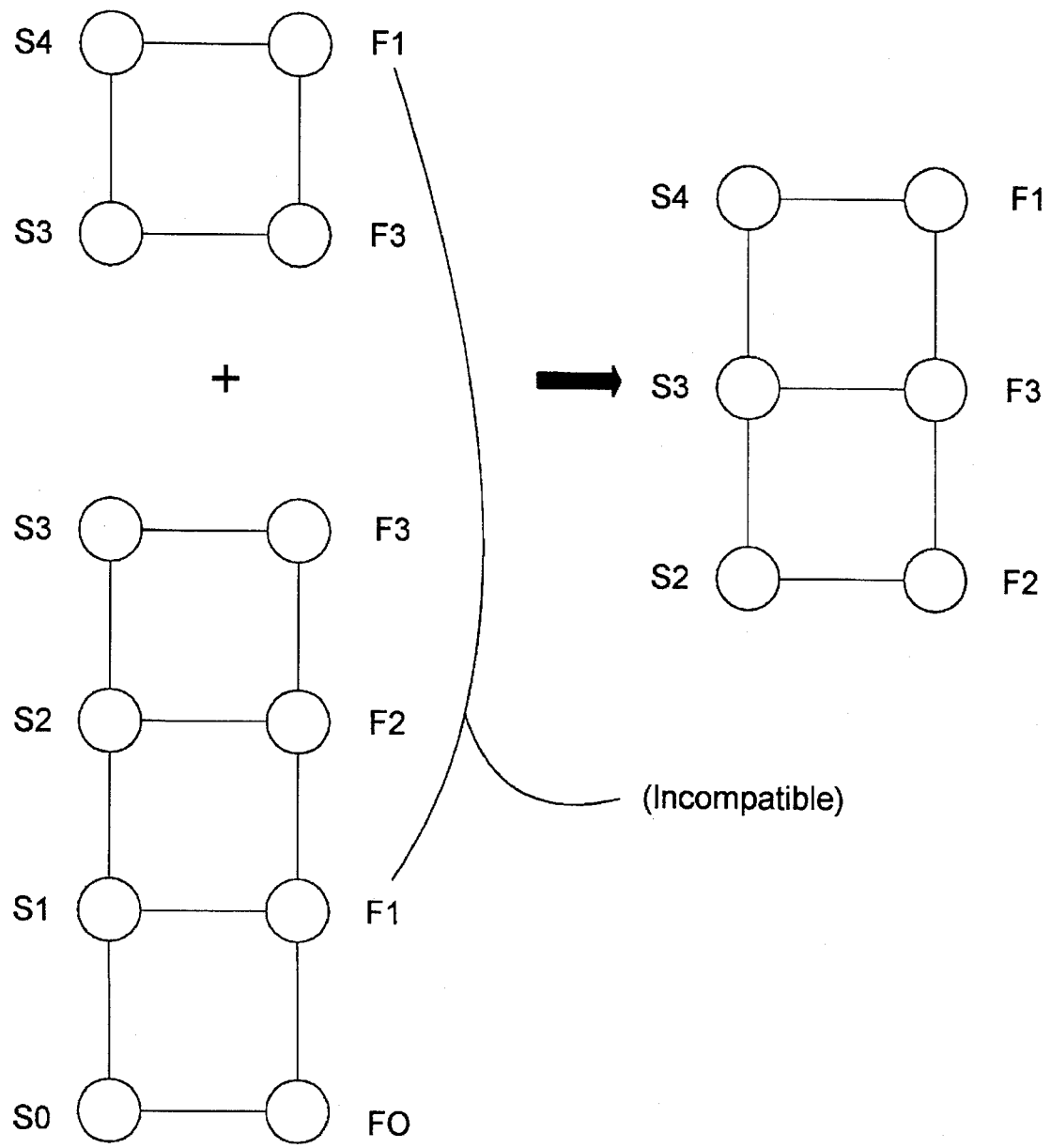
FIG. 16 illustrates a step and a ladder combined to form a new ladder, but with two rungs disconnected because of a conflict with the step.

A simple example of where the addition of a step leads to a disconnection is shown in FIG. 16. Here, we are about to connect the step to the hyperladder at the bound rung <S3, F3 >. However, there is a conflict between the rung <S1, F1 > in the hyperladder and the free rung <S4, F1 > in the step. We need not worry about destroying the hyperladder since it is just a copy of the original. But we need to keep the step intact. So in order to connect the step we remove the rung <S1, F1 > from the hyperladder, cutting off the lowest rung <S0, F0 >. Both of these rungs will be lost to the new hyperladder; the lowest rung will be eliminated shortly below. Recall that we are not destroying links in the original hyperladder, but only in a copy. Bear in mind also that, in removing rung <S1, F1 >, both links <S1, S2 > and <S2, S1 > are sought in and are eliminated from the hyperladder storage if they exist.

Returning to FIG. 15, we have just inquired 2100 whether the free rung conflicts with some other rung in the hyperladder, and we have determined 2200 whether there was a conflict with the search minutia of the free rung. Likewise, if 2300 the file minutia already has some other search mate in the hyperladder and we then say that the file minutia conflicts. (This is the situation in FIG. 16) If this is the case, we then remove 2310 all references in HLi' to the file minutia. As in the case of removing 2210 all references to a search minutia, we eliminate the single mated couple or rung in which the file minutia appears (as a file minutia). We also disconnect all the links which would connect that rung to others. Since the links are stored as pairs of search minutiae, we must first remember the identity of the search minutia in the rung that has just been eliminated. Then we eliminate all the links in which this particular search minutia appears.

As before, we need not worry that we would be destroying connectivity among rungs that we have already established. And we may have further unraveled the hyperladder.

We have now fully satisfied the test 2100 that there be no conflicts in the hyperladder with the free rung. We connect 2400 the step, knowing that there will be no conflicting rungs. We then enforce 2500 connectivity to the step. For this operation we start at the search minutia of the bound rung. We find all other search minutiae that are connected by linkage to this bound search minutia. Then we simply eliminate all the links in the hyperladder that have not been traversed in this linkage. Since, as we have noted, the direction of links is inconsequential, a link going either way between a pair of search minutiae is sufficient to demonstrate connectivity from one to the other.

Look again at the simple case of FIG. 16, wherein the step has been connected to the hyperladder, but a rung has been removed to accommodate the step. The lowest rung <S0, F0 >, having been disconnected, will now be lost. Once we enforce connectivity to the bound rung <S3, F3 >, this lowest rung, even if it were connected to a huge but similarly disconnected portion of hyperladder below it, is lost. If however this portion of hyperladder were connected to the bound rung by some other path, in addition to that through <S1, F1 >, then <S0, F0 > and the rest would be saved. Remember that hyperladders may have multiple connections at each rung.

Returning to FIG. 15, if there is anything left of hyperladder HLi', we add 2600 it at the end of the Table. By construction, the hyperladder represents the largest completely linked association of rungs that we can make by connecting, at the bound rung, the step to the original hyperladder.

Since we have just added 2600 a hyperladder to table 40, this is an opportunity to check whether table 40 is "full". When there are a large number of hyperladders in table 40, our experience has been that hyperladders are proliferating greatly because of strong matching going on at deeper levels of the algorithm. We will see below how a large number of correctly mated minutiae can lead to such a proliferation of hyperladders. In this case the search and file prints are almost certainly correctly matched, and we need not go further in constructing hyperladders for these prints. Hence, if 2610 there are at least 100 hyperladders in table 40, then we declare 2620 that table 40 is indeed "full" and go back 2630 to FIG. 14, where the condition is so recognized 1410 and a cut-out can be performed. There will be one more location, toward the very end, where there is another such declaration.

We now turn our attention to how a step can provide a "bridge" between two hyperladders, merging the two hyperladders and the step into a new hyperladder. Since a step in this preferred embodiment connects two mated pairs together, the maximum use of a step for merging hyperladders will be satisfied by merging only two hyperladders. As before, we must be careful not to modify the mates in the original hyperladders.

If a "step" were to consist of three or more mated pairs then the maximum use of the step for merging would not yet be satisfied by merging two hyperladders. In such cases we could merge three or more hyperladders together. The maximum number of hyperladders that can be merged by a single step is the number of mated pairs in the step that are available to bind to a hyperladder.

Figure 17:
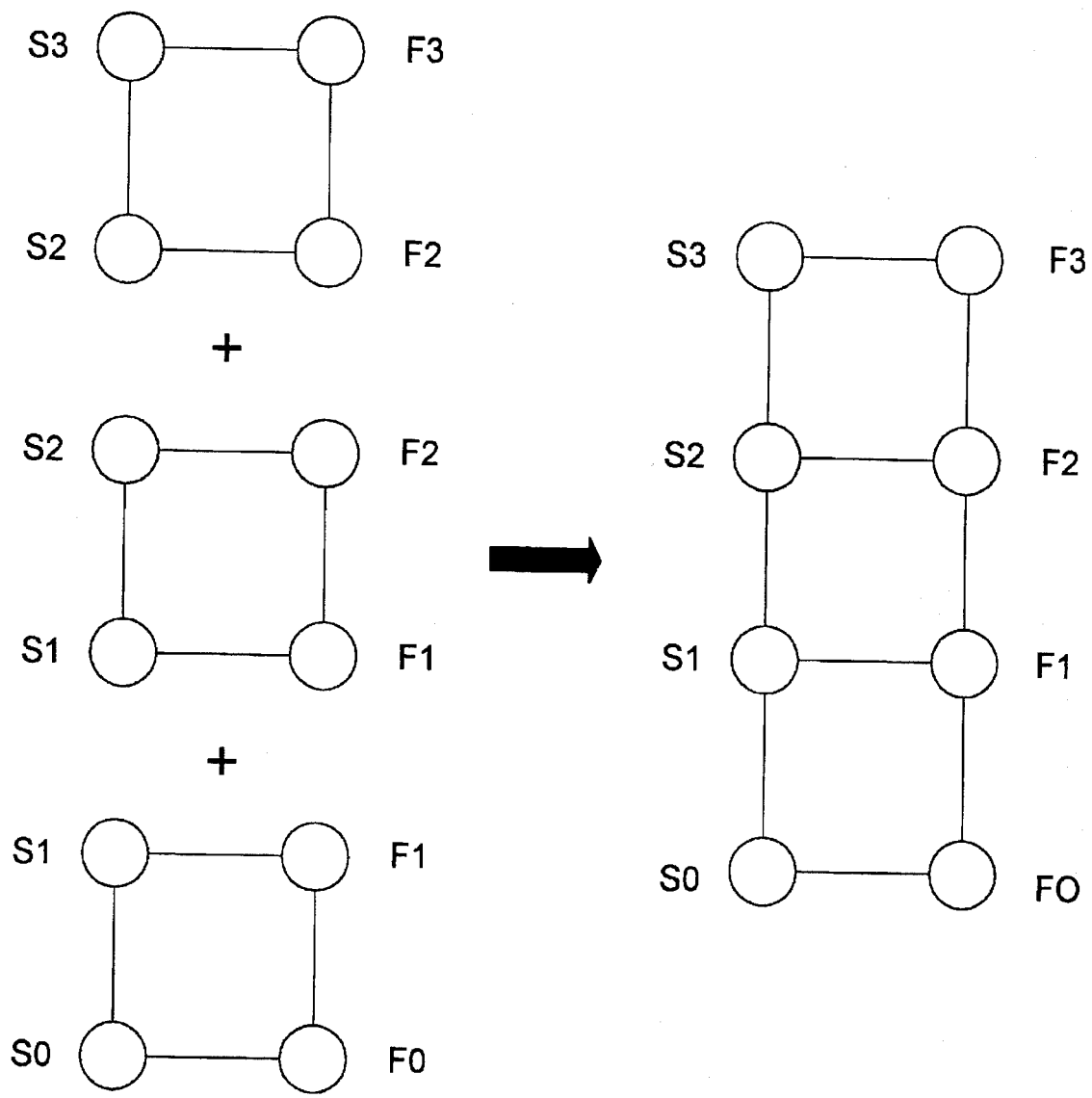
FIG. 17 illustrates the simplest merging of two hyperladders formed by the middle step.

The simplest case of a step merging two hyperladders is shown in FIG. 17. Here each of the hyperladders is itself a single step. The top and bottom hyperladders merge at the step in the middle to form a ladder with four rungs. Of course, most pairs of hyperladders being merged by a step will appear more complicated. But FIG. 17 shows the one salient feature of merging, that both rungs of the step are bound separately to one or the other of the hyperladders.

Returning to the exposition of FIG. 15, we are still in the loop over the original hyperladders HLi, having just added 2600 HLi' to the Table (and having just performed test 2610). We now loop 2700 over all the original hyperladders in table 40 that come after HLi. Call such a hyperladder "HLj" (i<j). As before, neither HLi nor HLj will be modified; only copies of them will be used to create, where possible, new hyperladders.

For the step to be able to merge HLi, having already the bound rung, to HLj, we know that HLj must contain the "free" rung. This rung is "free" relative to HLi, "bound" relative to HLj. Let us continue to refer to this rung as the "free" rung. If HLj does not contain the free rung then we cannot merge HLi and HLj with the step. If 2800 on the other hand HLj does contain the free rung then we proceed deeper to FIG. 18.

Starting FIG. 18, we have the step and we have hyperladders and HLj. We first look 3000 for conflicts between the rungs of HLi and HLj. If there are such conflicts we form lists of the conflicting minutiae. The list of conflicting search minutiae 3100 is a list all those search minutiae in the conflicting rungs that are mated to different file minutiae. Since there are just two hyperladders, this list is just those search minutiae that appear, as search minutiae, in two distinct rungs of the hyperladders. Likewise, the list of conflicting file minutiae 3200 is the list of those file minutiae that also appear, as file minutiae, in two distinct rungs of the hyperladders.

Being careful not to modify the original hyperladders HLi and HLj, we make copies of them, called "HLbound" 3300 and "HLfree" 3400, respectively. Analogous to test 2200 in FIG. 15, we then ascertain 3500 whether the bound search minutia is among the conflicting search minutiae. If it is then we know that, since the bound rung is truly part of HLbound, this bound search minutia must have a file mate in HLfree which is distinct from the bound file minutia. We therefore remove 3510 all references to the bound search minutia from HLfree. We then enforce 3520 connectivity of HLfree to the free search minutia. Unlike the processing shown in FIG. 15 however, where we had postponed enforcing 2500 connectivity to the step, we choose here to enforce 3520 connectivity immediately following the removal 3510 of references.

Now we may have just removed 3510 all references to a minutia and enforced 3520 connectivity to a single rung in HLfree. Hence, as we have seen before, we may have unraveled and destroyed some part of HLfree. If this is the case then the lists of conflicting minutiae may be too inclusive at this point. We may already have eliminated some minutiae in HLfree that appear in the lists as conflicting with HLbound. Indeed, both lists of conflicting search 3100 and file 3200 minutiae may be too large if a single minutia is removed from one of the hyperladders. We choose to leave the lists as they are for now, and to reformulate them later only if necessary.

There are four minutiae in the step, each of which may conflict with one of the hyperladders. The bound minutiae can conflict only with HLfree and the free minutiae can conflict only with HLbound. Hence, FIG. 18 shows three more tests (3600, 3700 and 3800) which complete the checking of conflicts with the step. Each of these tests triggers removal of the appropriate minutia from the appropriate hyperladder and enforcement of connectivity of the hyperladder to the rung that will be in common with the step. As before we postpone the reformulation of the lists of conflicting minutiae.

Figure 19:
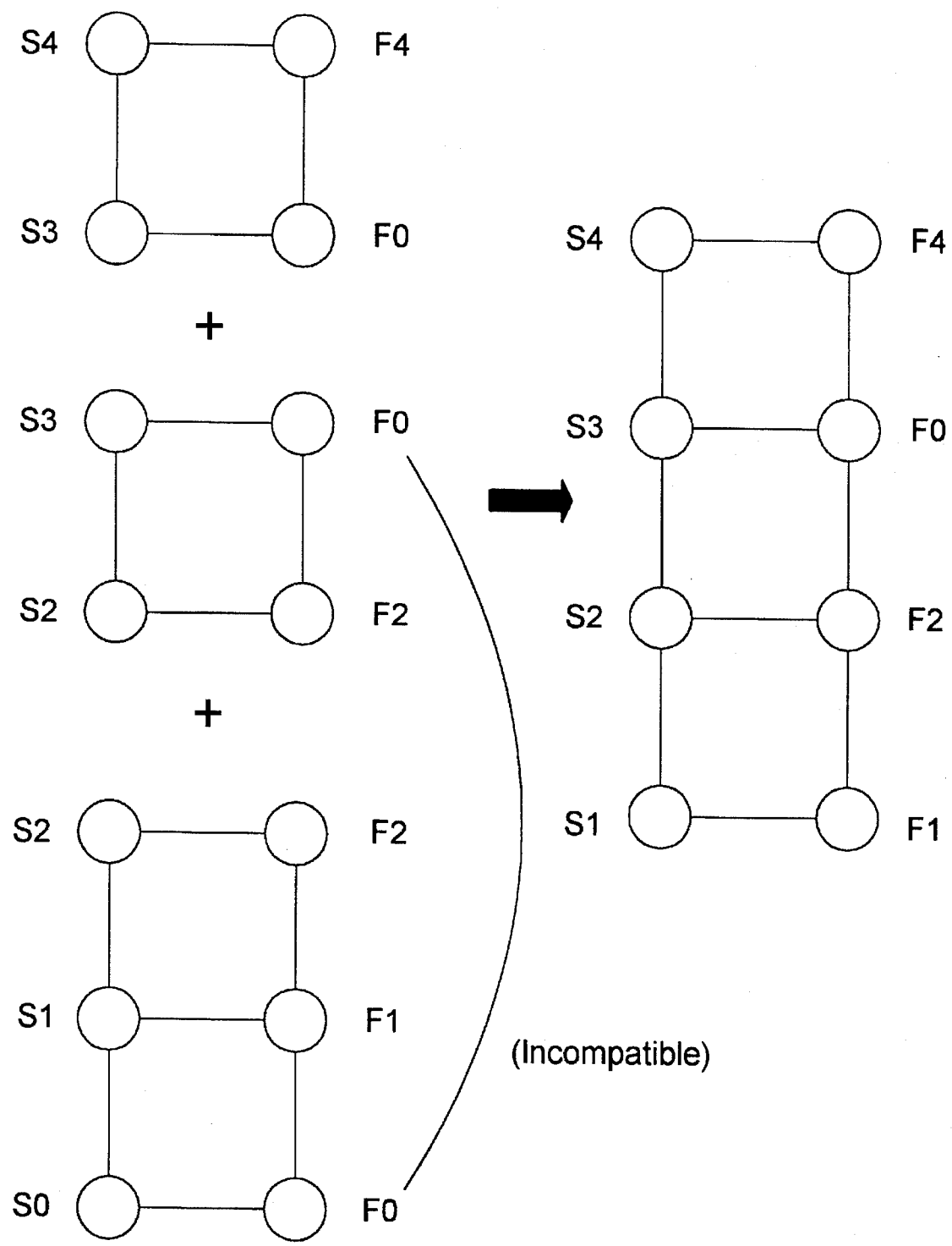
FIG. 19 illustrates the merging of two hyperladders where there is a conflict between a rung of the lower hyperladder and the step forming the merge.

A simple example of a step merging two hyperladders, wherein a conflict of one of the hyperladders with the step must be resolved, is shown in FIG. 19. Here there is a conflict between the rung <S0, F0 > in the lower hyperladder and the rung <S3, F0 > in the step. In this case the list of conflicting search minutiae 3100 starts out empty and the list of conflicting file minutiae 3200 starts out with a single entry F0. F0 is mated to two different search minutiae, S0 in the lower hyperladder and S3 in the both the step and the upper hyperladder. If the lower hyperladder is HLbound then F0 is called "Ffree" and S2 is called "Sbound" in FIG. 18. Test 3800 is satisfied. All references to file minutia F0 (Ffree) are removed 3810 from the lower hyperladder (HLbound). That is, rung <S0, F0 > gets chopped off the end of the hyperladder. Then connectivity of the hyperladder to S2 (Sbound) is enforced 3820. That is, only that part of the hyperladder linkable to rung <S2, F2 > survives; in fact, after rung <S0, F0 > gets chopped no further connectivity problems appear in the example of FIG. 19. After these operations the list of conflicting file minutiae 3200 should be empty when reformulated, and we would be prepared to merge the hyperladders across the step. Return now briefly to FIG. 18. Following the resolution of conflicts with the step, we ascertain 3900 whether there is anything left in both hyperladders HLi and HLj. If both hyperladders are still now not empty, we proceed deeper to FIG. 20.

Starting FIG. 20, we have the step and we have hyperladders HLbound and HLfree. We have just resolved all conflicts between each of the hyperladders and the step, but we have not yet addressed conflicts between the hyperladders. If we are to merge successfully the two hyperladders, or more properly, fragments thereof, we need now to resolve conflicts between the two hyperladders that have not been resolved by considering the step. Hence the first task is to reformulate the lists of conflicting search 4000 and file 4010 minutiae. Even if parts of HLbound and HLfree have survived up to this point, these lists may now have become empty if they were not so before. There are many cases to consider.

If both lists are empty then we could simply merge the hyperladders and add the step. The resultant hyperladder would satisfy all the rules of consistency and of connectivity. FIG. 19 shows the simple example of this case, wherein following the removal of the rung <S0, F0 > from the lower hyperladder there are no more conflicts to be resolved.

If, on the other hand, the list of conflicting search minutiae 4000 has one entry and the list of conflicting file minutiae 4010 remains empty, we know that the file mates of the one offending search minutia are different in the two hyperladders. Note that both choices of search-file mates represented in the two hyperladders are equally valid at this point. Recall that we want to postpone making judgements about which matings are correct until we have accounted for all the steps in list of steps 36, at the very end. But we cannot merge the hyperladders as they are, with this conflict in place. If we remove all references to the search minutia from one of the hyperladders, say HLbound, before the merge then we need not remove such references from HLfree. We will have resolved the conflict. Likewise, if we remove all references to the search minutia from HLfree then we need not do so from HLbound. The presence of a single search minutia in the list of conflicting search minutiae 4000 has introduced two distinct ways to merge HLbound and HLfree, along with the step, into a new hyperladder.

Similarly, if the list of conflicting search minutiae 4000 is empty but the list of conflicting file minutiae 4010 has one entry then there will be again two distinct ways to merge the hyperladders along with the step. If both lists have a single entry then there will be four ways of merging hyperladders. We have to remove all references to the search minutia and to the file minutia in one or the other of the hyperladders. We have four combinations here: i) remove them both from HLbound; ii) remove the search minutia from HLbound and the file minutia from HLfree; iii) remove the search minutia from HLfree and the file minutia from HLbound; and iv) remove them both from HLfree. Now there may be several entries in the lists of conflicting minutiae. Without belaboring the point, we can see that each of the entries in these lists introduces a one-bit choice in the number of ways of merging the hyperladders.

Figure 21:
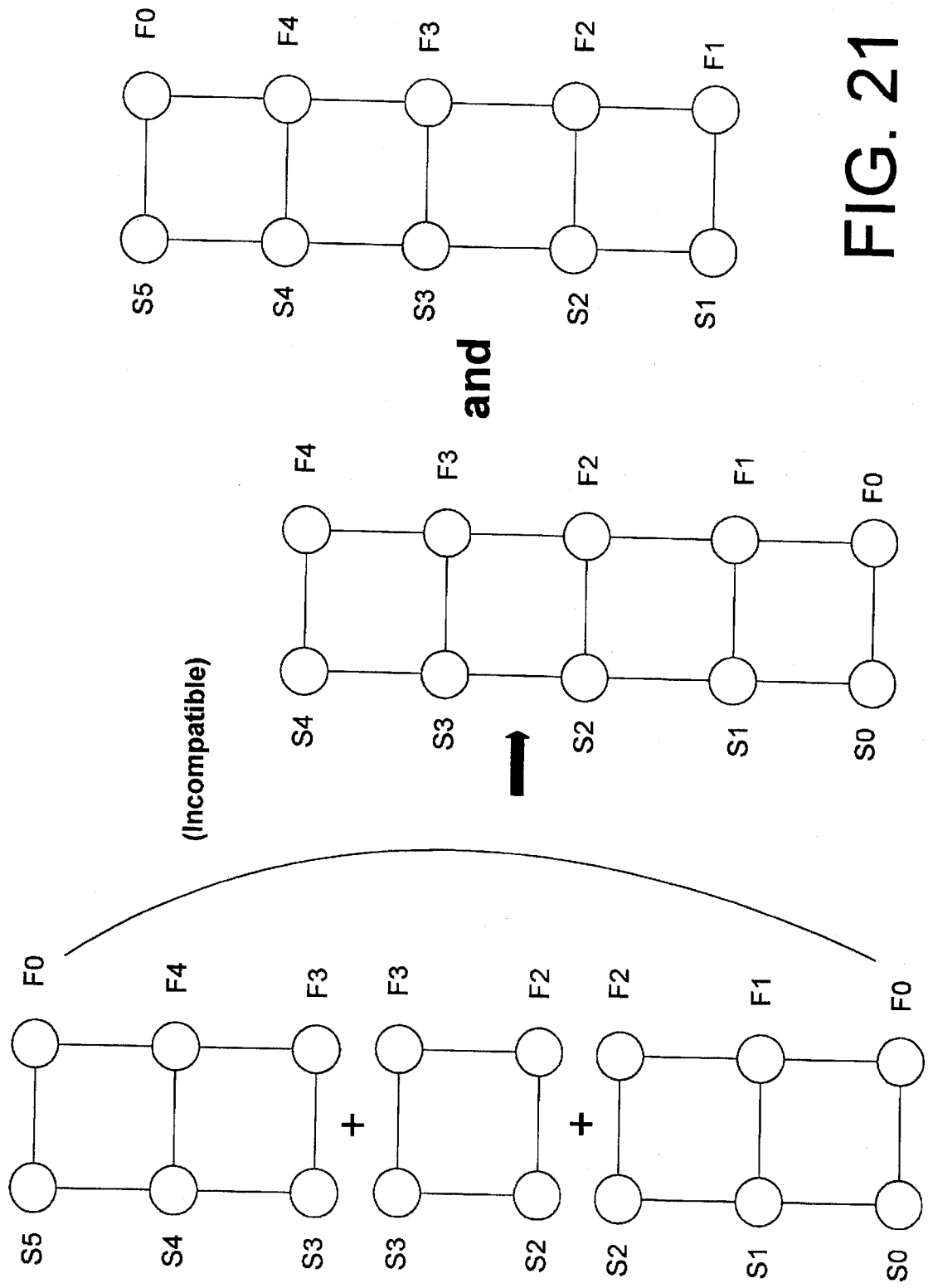
FIG. 21 illustrates the merging of two hyperladders where there is a conflict between rungs of the two hyperladders, yielding two new hyperladders.

Look at the simple example of FIG. 21. Two hyperladders are to be merged by a step. Neither hyperladder conflicts with the step itself, but they do conflict between themselves. The list of conflicting file minutiae 4010 contains a single entry F0 because of rungs <S0, F0 > and <S5, F0 >. There is a single-bit choice for removing references to F0 from the hyperladders: remove them from the top hyperladder or remove them from the bottom hyperladder. Doing either one resolves the conflict.

Accordingly, in FIG. 20 we articulate exhaustively the number of ways of merging hyperladders by establishing bit fields, or their equivalent in computer code. One bit field 4100 corresponds to the list of conflicting search minutiae 4000. The other bit field 4110 corresponds to the list of conflicting file minutiae 4010. The number of bits in each bit field is the number of minutiae in the corresponding list.

A loop 4200 over all the different combinations of the bit field for the conflicting search minutiae enables us to keep track of from which hyperladder references to which search minutia are removed. A second loop 4300 over all the different combinations of the bit field for the conflicting file minutiae enables us to do the same for the file minutiae. Inside the second loop 4300 we have a unique selection of bits in each field.

Looking 4400 now at each bit for search we consider a particular search minutia. We see whether the bit is zero. If 4410 it is zero then we remove 4420 all references to the search minutia from HLbound and enforce 4430 connectivity of HLbound to the bound rung. Otherwise if 4440 the bit is one then we remove 4450 all references to the search minutia from the other hyperladder, HLfree, and enforce 4460 connectivity there.

Since there is a good chance that either one of the hyperladders no longer exists, we test 4500 to determine whether both do. If either is empty then we are free to consider 4510 the next bit field combination in the second loop 4300. If however, both do still exist, we look 4600 at each bit for the conflicting file minutiae. We again remove references to minutiae and enforce connectivity analogously to what was done for the conflicting search minutiae.

If 4700 by now there is anything left of both hyperladders, we merge 4710 them, connect 4720 the step, and finally add 4730 the new hyperladder to table 40. Remember that this new hyperladder is but one among all those enabled by the bit fields. This completes the merging of hyperladders by the step.

Look once more at the simple example of FIG. 21. We have a one-bit choice for removing references to file minutia F0. This leads to the addition of two separate new hyperladders to table 40, each consistent in and of itself and maximally connected out from the step forming the merge. Nevertheless, the two new hyperladders conflict between themselves, and so represent distinct and competing global associations among minutiae.

This is the second place in the algorithm where a hyperladder is added 4730 to table 40. So this is another opportunity to check whether table 40 is "full". If 4732 there are at least 100 hyperladders in table 40, then we once more declare 4734 that table 40 is "full" and go back 4736 to FIG. 14, where the condition is so recognized 1410 and a cut-out can be performed.

One can see now why matched search and file fingerprints might well cause a proliferation of hyperladders in table 40. With a large number of correctly mated search-file pairs, the one "true" hyperladder, wherein these pairs are the rungs, will be large itself. But due to distortion there will also be other hyperladders, large and mostly correct, yet with small conflicts among them. As table 40 is built many of these hyperladders can be generated. The lists of conflicting minutiae may be small for each pair among them, but, as we have seen, they would proliferate greatly. The more minutiae the more such hyperladders, even if the best hyperladder represents the perfect matings between search and file. Hence, recognizing 1410 this condition is advised so that the matcher does not attempt too much work for a single, correctly matching file print.

The steps of FIGS. 14, 15, 18 and 20 describe the function of hyperladder builder 38 of FIGS. 1 and 3. These steps express an algorithm that is shown as ten "tabs deep". That is, between loop 1000 of FIG. 14 and, say, the remove 4420 operation of FIG. 20 there are ten levels of indentation. While the foregoing implementation is quite complex, a simpler sequence of operations may perform the function of hyperladder builder 38.

As shown in FIG. 3, hyperladder builder 38 generates table of hyperladders 40. Recall that our original loop 1000 of FIG. 14 has iterated over all the steps available from list of steps 36. We have addressed all the possibilities for each step's being included in hyperladders of table 40, where:

i) The step cannot be connected anywhere (FIG. 14, 1500).

ii) The step connects to single hyperladders (FIG. 15, 2400).

iii) The step enables merges of pairs of hyperladders (FIG. 20, 4720).

Hence, table of hyperladders 40 represents every possible chaining of subsets of these steps into hyperladders. Every possible global linkage among steps will be found in the hyperladders. Indeed, the largest hyperladder in table 40 represents the best global association. This is all true, of course, within the constraint that a cut-out for speed will truncate hyperladder construction.

So, ignoring cut-outs for the moment, the algorithm constructs every possible distinct hyperladder. But there are different ways to establish which is the "largest" such hyperladder. One could choose that hyperladder with:

i) the largest number of mates (rungs); or ii) the largest number of links; or even iii) the densest linkage among rungs, by some measure of connectivity.

The preferred embodiment selects the hyperladder with ii) the largest number of links. This choice maximizes the number of local associations among steps that can be combined into a global association, which seems to satisfy the intent of constructing these chains. On the one hand the hyperladder in table 40 with the largest number of links may very occasionally not be the one with the largest number of mates, choice i). But then the latter hyperladder would be necessarily less "hyper" and more "strung out" than the former; fewer links would be used to connect, in the aggregate, some small number of additional rungs. Hence the connectivity to some rungs would be less. On the other hand the measurement for choice ii) is completely unambiguous, unlike that for choice iii), while still addressing the connectivity issue addressed by choice iii) and ignored by choice i). Note, however, that alternative embodiments within the scope of the present invention may use any one of the three criteria listed above, other criteria, or any combination of criteria for selecting which hyperladder is the "largest."

In accordance with the preferred embodiment, hyperladder sorter 42 sorts the hyperladders in table of hyperladders 40 by the number of links (FIG. 3). If the best hyperladder has more than some upper threshold number of links, hyperladder comparator 43 declares that the search print and the file print match. If the best hyperladder has fewer than some lower threshold number of links, hyperladder comparator 43 declares that the search print and file print do not match. In the present embodiment, for the purposes of counting links we count the links as stored in the hyperladder. Two links in opposite directions (between the same minutiae) both get counted.

If the top hyperladder has 20 links or more then it shows a definite match. (The geometric criteria for step formation in the tests are those given in the discussion of FIG. 4. The topological criterion was left unrestricted.) One hyperladder has been constructed with more than 130 links, derived from high quality rolled fingerprint impressions for both the search and file prints. This hyperladder was constructed before the cut-outs shown in FIG. 14 were implemented. Constructing such large hyperladders is slow. As we have noted, with long hyperladders table 40 becomes unwieldy, with many separate hyperladders all with little conflicts among themselves. If one of the cut-outs of FIG. 14 is triggered the hyperladder is almost guaranteed to have a large number of links. Thus, a "match" will be indicated by hyperladder comparator 43: 1) if the number of links exceeds the upper threshold value, or 2) if a cut-out was performed.

At the other end, hyperladders with only six links in a triangle of three minutiae are very common and do not show matches. Eight links implies that there are at least four minutiae involved, again very common and not enough. Hyperladder links in the low teens are borderline.

By tightening the geometric criteria for forming steps one can speed up the matching since there will be fewer steps, especially in non-matching prints. Fewer steps leads to more infrequent and simpler hyperladder construction, both of which add to speed. With tighter constraints, 20 links would carry even more significance. Hyperladder links in the high teens would probably indicate matches. Links on the order of six or eight still would be below the upper threshold for indicating a match.

While the invention has been described in its preferred exemplary embodiment, it is to be understood that the words which have been used are words of description rather than limitation, and that changes may be made within the purview of the appended claims without departing from the true scope and spirit of the invention in its broader aspects.

What is claimed is:

1. An apparatus for determining whether a search fingerprint matches any of a plurality of file fingerprints stored in an electronic database, comprising:

means for convening a fingerprint to a list of minutiae descriptive of the fingerprint;

means for comparing the minutiae of a search fingerprint to the minutiae of one of the plurality of file fingerprints;

means for pairing a first of the minutiae of the search fingerprint to a second of the minutiae of the search fingerprint if the attributes of the first and second search minutiae are related within predetermined limits;

means for pairing a first of the minutiae Of the file fingerprint to a second of the minutiae of the file fingerprint if the attributes of the first and second file minutiae are related within predetermined limits:

means for mating one of the pairs of minutiae of the search fingerprint to one of the pairs of minutiae of the file fingerprint if the attributes of the search pair and the file pair are substantially similar within predetermined limits;

means for linking the mated pairs into a chain; and means for indicating a match if the number of links in the chain exceeds a predetermined upper threshold value.

2. The apparatus of claim 1 wherein the means for pairing the search minutiae pairs the first and second search minutiae when the first and second search minutiae are in proximity to each other according to their relative positions, wherein the means for pairing the file minutiae pairs the first and second file minutiae when the first and second file minutiae are in proximity to each other according to their relative positions, and wherein the apparatus further comprises means for storing the paired search minutiae and the paired file minutiae.

3. The apparatus of claim 2 wherein the means for pairing the search minutiae and the means for pairing the file minutiae each relate the pair of minutiae to each other using information local to the minutiae.

4. The apparatus of claim 3 wherein the local information comprises topological information.

5. The apparatus of claim 4 wherein the local topological information comprises a count of the ridges separating the pair.

6. The apparatus of claim 4 wherein the local information further comprises spatial information.

7. The apparatus of claim 2 wherein each of the means for comparing the minutiae comprises:

means for comparing the attributes of the paired minutia of the search fingerprint against the attributes of the paired minutia of one of the file fingerprints;

means for measuring a first radial distance from the first search minutia to the second search minutia and for measuring a second radial distance from the first file minutia to the second file minutia;

means for measuring a first angular separation of the first search minutia to the second search minutia, and for measuring a second angular separation of the first file minutia to the second file minutia;

means for measuring a first orientation angle of the second search minutia with respect to a reference frame of the first search minutia, and for measuring a second orientation angle of the second file minutia with respect to a reference frame of the first file minutia;

means for counting a first number of ridges separating the first search minutia and the second search minutia and for counting a second number of ridges separating the first file minutia and the second file minutia; and means for mating the first search minutia with the first file minutia if:

the difference between the first radial distance and the second radial distance is within a first predetermined tolerance;

the difference between the first angular separation and the second angular separation is within a second predetermined tolerance;

the difference between the first orientation and the second orientation is within a third predetermined tolerance; and the difference between the first number of ridges and the second number of ridges is within a fourth predetermined tolerance.

8. The apparatus of claim 2 further comprising:

a table for storing the search pairs and the file pairs;

removing a search pair form the table if no corresponding file pairs of minutiae are stored in the table.

9. The apparatus of claim 1 wherein each of the means for pairing the minutiae comprises means for relating the paired minutiae to each other using a plurality of measurements.

10. The apparatus of claim 1 further comprising means for storing a large number of the minutiae representative of the file fingerprints in the database.

11. The apparatus of claim 1 further comprising means for indicating no match if the number of links in the chain is below a predetermined lower threshold value.

12. The apparatus of claim 1 wherein the means for linking the mated pairs into a chain comprises means for linking mated minutiae to other mated minutiae to form a chain of mated minutiae.

13. The apparatus of claim 1 further comprising means for forming a chained ladder structure of linked, paired minutiae, the ladder structure having at least one rung and at lease two risers, wherein:

each rung of the ladder comprises mated search and file minutiae;

one of the risers of the ladder comprises paired search minutiae; and another of the risers of the ladder comprises paired file minutiae.

14. The apparatus of claim 1 further comprising:

means for storing the paired minutiae into a table of quadrant pairs;

means for storing the mated pairs in a table;

means for building a step from each of the mated pairs stored in the table if the attributes of the mated pairs are substantially similar within predetermined limits;

means for linking a plurality of the steps together in a chained ladder structure of the steps, each step having at least one rung and at least two risers, wherein each rung of the ladder comprises mated search and file minutiae, one of the risers of the ladder comprises paired search minutiae, and another of the risers of the ladder comprises paired file minutiae;

means for storing each chained ladder structure;

means for eliminating any chained ladder structure that is a subset of a larger chained ladder structure;

means for counting the number of links in each ladder structure; and means for indicating a match of the search fingerprint and the file fingerprint if the number of links exceeds a predetermined upper threshold value.

15. The apparatus of claim 14 wherein each rung of the ladder structure may be common to another stored ladder structure.

16. The apparatus of claim 15 further comprising means for evaluating the compatibility of the steps and for inhibiting the chaining of incompatible steps.

17. The apparatus of claim 15 further comprising means for sorting the chained ladder structures according to the number of total links in the chain and for determining whether the number of links is greater than the predetermined upper threshold value.

18. A method for determining whether a search fingerprint matches any of a plurality of file fingerprints stored in an electronic database, comprising the steps of:

converting a fingerprint to a plurality of minutiae descriptive of the fingerprint;

comparing the minutiae of a search fingerprint to the minutiae of one of the plurality of file fingerprints;

pairing a first of the minutiae of the search fingerprint to a second of the minutiae of the search fingerprint if the attributes of the first and second search minutiae are related within predetermined limits;

pairing a first of the minutiae of the file fingerprint to a second of the minutiae of the file fingerprint if the attributes of the first and second file minutiae are related Within predetermined limits;

mating one of the pairs of minutiae of the search fingerprint to one of the pairs of minutiae of the file fingerprint if the attributes of the search pair and the file pair are substantially similar within predetermined limits;

linking the mated pairs into a chain; and indicating a match if the number of links in the chain exceeds a predetermined upper threshold value.

19. The method of claim 18 further comprising the steps of:

pairing the first and second search minutiae when the first and second search minutiae are in proximity to each other according to their relative positions;

pairing the first and second file minutiae when the first and second file minutiae are in proximity to each other according to their relative positions; and storing the paired search minutiae and the paired file minutiae.

20. The method of claim 19 wherein further comprising the steps of:

storing the paired file minutiae into a table;

eliminating a particular paired file minutiae from the table if other corresponding paired file minutiae within the table do not confirm the validity of the particular paired file minutiae.

21. The method of claim 19 wherein the step of comparing the minutiae comprises:

measuring a first radial distance from the first search minutia to the second search minutia to the second file minutia;

measuring a first angular separation of the first search minutia to the second search minutia, and for measuring a second angular separation of the first file minutia to the second file minutia;

measuring a first orientation angle of the second search minutia with respect to a reference frame of the first search minutia, and for measuring a second orientation angle of the second file minutia with respect to a reference frame of the first file minutia;

counting a first number of ridges separating the first search minutia and the second search minutia and counting a second number of ridges separating the first file minutia and the second file minutia;

and wherein the step of mating One of the pairs of search minutiae to one of the pairs of the file minutiae includes mating the first search minutia with the first file minutia if:

the difference between the first radial distance and the second radial distance is within a first predetermined tolerance;

the difference between the first angular separation and the second angular separation is within a second predetermined tolerance;

the difference between the first orientation and the second orientation is within a third predetermined tolerance; and the difference between the first number of ridges and the second number of ridges is within a fourth predetermined tolerance.

22. The method of claim 19 wherein the paired minutiae corresponding to the search fingerprint comprises a search pair and wherein the paired minutiae corresponding to the file fingerprint comprises a file pair, the method further comprising the steps of:

storing the search pairs and the file pairs in a table;

removing a search pair from the table if no corresponding file pairs of minutiae are stored in the table.

23. The method of claim 18 further comprising the step of linking together mated minutiae to other mated minutiae to form a chain.

24. The method of claim 18 wherein the step of mating the minutiae includes the step of forming a chained ladder structure of linked, paired minutiae, the ladder structure having at least one rung and at least tow risers, wherein:

each rung of the ladder comprises mated search and file minutiae;

one of the risers of the ladder comprises paired search minutiae; and another of the risers of the ladder comprises paired file minutiae.

25. The method of claim 18 further comprising the steps of:

storing the paired minutiae into a table of quadrant pairs;

mating the paired search minutiae with the paired file minutiae;

storing the mated pairs in a mates table;

building a step from each of the mated pairs stored in the mates table if the attributes of the mated pairs are substantially similar within predetermined limits;

wherein the step of linking the minutiae comprises linking a plurality of the steps together in a chained ladder structure of the steps, each step having at least one rung and at least two risers, wherein each rung of the ladder comprises mated search and file minutiae, one of the risers of the ladder comprises paired search minutiae, and another of the risers of the ladder comprises paired file minutiae;

storing each chained ladder structure;

eliminating any chained ladder structure that is a subset of a larger chained ladder structure; and counting the number of links in each ladder structure.

26. The method of claim 25 wherein each rung of the ladder structure may be common to another stored ladder structure.

27. The method of claim 25 further comprising the steps of:

evaluating the compatibility of the steps; and inhibiting the chaining of incompatible steps.

28. The method of claim 25 further comprising the steps of:

sorting the chained ladder structures according to the number of total links in the chain; and determining whether the number of links is greater than the predetermined upper threshold value.

29. A method for determining whether a search fingerprint matches any of a plurality of file fingerprints stored in an electronic database, comprising the steps of:

providing a plurality of search minutiae descriptive of the search fingerprint;

providing a plurality of file minutiae descriptive of the file fingerprint;

pairing the search minutiae that are in proximity to each other according to their relative positions based on information local to the search minutiae;

mating the paired search minutiae comprising a first search minutia and a second search minutia with corresponding paired file minutiae comprising a first file minutia and a second file minutia, the mating comprising the steps of:

measuring a first radial distance from the first search minutia to the second search minutia and for measuring a second radial distance from the first file minutia to the second file minutia;

measuring a first angular separation of the first search minutia to the second search minutia, and for measuring a second angular separation of the first file minutia to the second file minutia;

measuring a first orientation angle of the second search minutia with respect to a reference frame of the first search minutia, and for measuring a second orientation angle of the second file minutia with respect to a reference frame of the first file minutia;

counting a first number of ridges separating the first search minutia and the second search minutia and for counting a second number of ridges separating the first file minutia and the second file minutia;

mating the first search minutia with the first file minutia if:

the difference between the first radial distance and the second radial distance is within a first predetermined tolerance;

the difference between the first angular separation and the second angular separation is within a second predetermined tolerance;

the difference between the first orientation and the second orientation is within a third predetermined tolerance; and the difference between the first number of ridges and the second number of ridges is within a fourth predetermined tolerance;

building a step from each of the mated pairs, each step having at least one rung and at least two risers, wherein each rung of the ladder comprises mated search and file minutiae, one of the risers of the ladder comprises paired search minutiae, and another of the risers of the ladder comprises paired file minutiae;

placing each step in a ladder table, and linking each step to steps already linked together in the ladder table if the attributes of the steps are compatible, thereby forming a plurality of chained ladder structures;

indicating a match if the number of links in any of the chained ladder structures exceeds a predetermined upper threshold value.

30. The method of claim 29 further comprising the steps of:

sorting the plurality of chained ladder structures according to the number of links; and deleting any chained ladder structures that are subsets of larger chained ladder structures.

31. The method of claim 29 further comprising the step of resolving conflicts between steps if the attributes of the steps are incompatible.

* * * * *